(12) United States Patent
Tan et al.

(10) Patent No.: US 8,072,683 B2
(45) Date of Patent: Dec. 6, 2011

(54) CARTESIAN POLARIZERS UTILIZING PHOTO-ALIGNED LIQUID CRYSTALS

(75) Inventors: Kim Leong Tan, Santa Rosa, CA (US); Karen Denise Hendrix, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 1122 days.

(21) Appl. No.: 11/843,135

(22) Filed: Aug. 22, 2007

(65) Prior Publication Data

US 2008/0049184 A1    Feb. 28, 2008

Related U.S. Application Data

(60) Provisional application No. 60/823,326, filed on Aug. 23, 2006.

(51) Int. Cl.
    *G02B 5/30* (2006.01)
(52) U.S. Cl. .................................. 359/489.16
(58) Field of Classification Search .................. None
    See application file for complete search history.

(56) References Cited

U.S. PATENT DOCUMENTS

| | | | |
|---|---|---|---|
| 5,196,953 A | 3/1993 | Yeh et al. | 349/119 |
| 6,160,597 A | 12/2000 | Schadt et al. | 349/98 |
| 6,646,703 B1 | 11/2003 | Seiberle et al. | 349/124 |
| 7,068,344 B2 * | 6/2006 | Pokorny et al. | 349/175 |
| 2004/0246876 A1 | 12/2004 | Kim et al. | 369/112.23 |
| 2005/0122454 A1 | 6/2005 | Sharp | 349/119 |
| 2005/0128391 A1 | 6/2005 | Tan et al. | 349/117 |
| 2006/0126459 A1 | 6/2006 | Moon et al. | 369/44.37 |

FOREIGN PATENT DOCUMENTS

| | | |
|---|---|---|
| EP | 1542044 | 6/2005 |
| EP | 1726987 | 11/2006 |
| EP | 1783520 | 5/2007 |
| WO | WO 2006014041 A1 * | 2/2006 |

OTHER PUBLICATIONS

M. Kitagawa and M. Tateda, "Form birefringence of SiOx/Ta2O5 periodic multilayers", Appl. Opt., vol. 24, No. 20, pp. 3359-3362 (1985).
Weber et al. "Giant birefringent optics in multi-layer polymer mirrors," Science, 287, pp. 2451-2456, 2000.
V.G. Chigrinov et al., "New developments in liquid crystal photo-aligning by azo-dyes," SID 06 Digest, pp. 1253-1256, 2006.

(Continued)

*Primary Examiner* — Derek S Chapel
(74) *Attorney, Agent, or Firm* — Matthew A. Pequignot; Pequignot + Myers LLC

(57) ABSTRACT

Cartesian polarizers utilizing liquid crystal polymers (LCPs) are provided for use as laser protection filters in optical pick-up units. The LCPs are photo-aligned and cross-linked into a polymer host to provide a durable filter. According to one embodiment, the LCP molecules exhibit a cholesteric phase and are coupled to one or more quarter-wave retarders. According to another embodiment, the LCP molecules are used to form a multi-layer stack using the giant-birefringence optics effect.

15 Claims, 16 Drawing Sheets

OTHER PUBLICATIONS

S.K. Eckhardt et al., "3M PBS for high performance LCoS optical engine," in Projection Displays IX, M.H. Wu, ed., Proc. SPIE-IS&T Electronic Imaging, 5002, pp. 106-110, 2003.

D. Hansen, E. Gardner, R. Perkins, M. Lines and A. Robbins, "The display applications and physics of the Proflux wire grid polarizer," SID 02 Digest, pp. 730, 2002.

D.W. Berreman and T.J. Scheffer, "Bragg Reflection of Light from Single-Domain Cholesteric Liquid-Crystal Films," Phys. Rev. Lett. 25, pp. 577-581, 1970.

W.D. St. John, W.J. Fritz, Z.J. Lu, and D.-K. Yang, "Bragg reflection from cholesteric liquid crystals," Phys. Rev. E, 51, p. 1191, 1995.

T. Bachels, K. Schmitt, J. Fünfschilling, M. Stalder H. Seiberle and M. Schadt, "Advanced Electronic Color Switch for Time-Sequential Projection," Proc. SID 2001, pp. 1080-1083, 2001.

P. Yeh, "Electromagnetic propagation in birefringent layered media," J. Opt. Soc. Am. 69, pp. 742-756, 1979.

D.W. Berreman, "Optics in stratified and anisotropic media: 4x4 matrix formulation," J. Opt. Soc. Am. 62, pp. 502-510, 1972.

C. L. Bruzzone, et al. "High-performance LCoS optical engine using Cartesian polarizer technology," SID Symposium Digest Tech Papers, 34, pp. 126-129, 2003.

\* cited by examiner

A-plate or optic-axis // X-axis

C-plate or optic-axis // Z-axis

A-plate or optic-axis // X-axis

Isotropic layer, without an optic axis

CARTESIAN POLARIZERS UTILIZING PHOTO-ALIGNED LIQUID CRYSTALS

CROSS-REFERENCE TO RELATED APPLICATIONS

This application claims priority from U.S. Provisional Application No. 60/823,326 filed Aug. 23, 2006, which is hereby incorporated by reference for all purposes.

MICROFICHE APPENDIX

Not Applicable.

TECHNICAL FIELD

The present application relates generally to Cartesian polarizers utilizing photo-aligned liquid crystals, and in particular to Cartesian polarizers utilizing photo-aligned liquid crystal polymers for use in optical pickup units.

BACKGROUND OF THE INVENTION

The compact disc (CD) was invented in the 1980s to allow for an all-digital recording of audio signals. The optical pick-up unit (OPU) for audio-CD and/or CD-ROM uses a near-infrared (NIR) 780 nm semiconductor laser to read-out the encoded digital information. The numerical aperture (NA) of the objective lens is about 0.45, allowing a pit (one unit of encoding on disc) measuring about 100 nm deep, 500 nm wide and 850 nm to 3500 nm long depending on the radial distance from the disc center.

The first commercial digital versatile disc (DVD) appeared in the 1990s, with crucial optical design changes to allow for a physical recording density increase of about 3.5 times CDs. The gain in physical density was made possible by employing a shorter wavelength semiconductor (SC) laser (e.g., 650 nm, 660 nm red band, etc, compared to 780 nm near-IR band (NIR) in audio-CD) and a larger NA lens (e.g., 0.6 NA requiring a 0.6 mm thick DVD disc). A backward compatible DVD/CD optical pick-up unit employs two laser sources, either packaged as a single component or discretely, that have their read beams coupled by polarization beam combiners (PBCs) and/or dichroic beam combiners (DBCs).

Successors to the DVD media format range from Blu-ray Disc (BD) to high density HD-DVD. In these systems, the read/write SC laser wavelength is further decreased to about 405~410 nm blue-violet band and the NA is increased to about 0.85. In BD or HD-DVD backward compatible DVD/CD systems, a third wavelength laser (e.g., co-packaged or discrete with respect to the first two lasers) is required to support all three disc media formats.

Referring to FIG. 1, there is shown one example of a prior art 3-wavelength HD-DVD/DVD/CD optical pick-up unit (OPU). The OPU 10 includes an array of semiconductor laser sources 20 (i.e., shown as three discrete laser diodes (LD) including a first LD 21 at $\lambda$=780 nm, a second LD 22 at $\lambda$=660 nm, and a third LD 23 at $\lambda$=405 nm), the output of which are spatially multiplexed by an array of polarization beam combiner (PBC) cubes 30, is collimated by a lens system 35 and is folded by a leaky mirror 40 before being imaged (focused) onto a single "pit" area on the rotating disc media 42 via an objective lens 36. The leaky mirror 40 allows for a small fraction (e.g., 5%) of the incident beam energy to be tapped off and focused onto a monitor photodiode (PD) 46 via another lens 37.

The output from the array of LD sources 20 is substantially linearly polarized (e.g., 'S' polarized with respect to the PBC hypotenuse surface). Prior to reaching the array of PBC cubes 30, these linearly polarized beams are transmitted through an array of low-specification polarizers 25, which protect the LD sources from unwanted feedback (e.g., "P" polarized light). In general, each polarizer 25 is a polarizing beamsplitter used to reflect light in one polarization state and to transmit light in the orthogonal polarization state. Conventionally, the protection filters 25 are simple dichroic absorptive polarizers with a 10:1 polarization extinction ratio.

The main ray from each of the LD sources 20 is directed along the common path 49 towards the disc media 42. Prior to reaching the quarter-waveplate (QWP) 41, the light is substantially linearly polarized. After passing through the QWP 41, the linearly polarized (LP) light is transformed into circularly polarized (CP) light. The handedness of the CP light is dependent on the optic axis orientation of the QWP (for a given S- or P-polarized input). In the example shown, with 'S' polarization input to the QWP, if the slow-axis of the QWP is aligned at 45° counter clockwise (CCW), with respect to the p-plane of the PBC, a left-handed circularly (LHC) polarized results at the exit of the QWP (LHC, having a Jones vector [1 j]$^T$/$\sqrt{2}$ and with the assumption of intuitive RH-XYZ coordinate system while looking at the beam coming to the observer).

In a pre-recorded CD and/or DVD disc, where there is a physical indentation of a recorded pit, the optical path length difference between a pit and its surrounding "land", at $\frac{1}{6}$ to $\frac{1}{4}$ wave, provides at least partial destructive interference and reduces the light detected by the main photodiode 45 positioned at the second port of the PBC cube array 30. On the other hand, the absence of a pit causes the change of the CP handedness, at substantially the same light power in its return towards the PBC cube array 30. The light has effectively been transformed by the QWP in double-passing to convert the initially S-polarized light to P-polarized light on its return to the PBC array 30.

In the configuration illustrated in FIG. 1, where the reflected-port of the PBC array 30 is used to transmit the multiplexed LD output along the common light path 49, the absence of a pit signals polarization conversion and a high PD output is detected (on-state). The original CD-DA Red Book specification calls for greater than 70% reflectivity. This light is substantially P-polarized. The presence of a pit causes at least partial destructive interference between the light reflected from the pit and the surrounding land. The original CD-DA Red Book specification calls for no more than 28% reflectivity. This off-state light is not necessarily entirely P-polarized, as it is the result of diffraction (e.g., although it traverses the QWP twice). Some of the off-state S-polarized light and P-polarized light appears at the reflected port of the PBC array 30 and is steered towards the LD array 20. The array of protection filters 25 is provided to block this unwanted destructive light interference steered towards the LD array 20 (e.g., P-polarized light).

As discussed above, the protection filters 25 conventionally used are simple dichroic absorptive polarizers. Dichroic polarizers, such as the Polaroid-type dye sheet polarizer developed by E. H. Land in 1929, derive their diattenuation by selective anisotropic absorption of incident light. Due to this absorption, these sheet polarizers are not typically suitable for high power applications. In the backward compatible BD/HD-DVD 3-wavelength OPU system illustrated in FIG. 1, the blue-violet light at approximately 405 nm can have a power level between 100 and 500 mW when used as a write beam. In addition to this high power, the relatively short wavelength can potentially cause photo-induced damage to the dye sheet polarizers.

Unfortunately, the selection of a suitable replacement has not been obvious. While inorganic non-absorptive crystal polarizers in cemented prism form, such as Glan-Thomson or Glan-Taylor crystal polarizers, are more durable, they are also more expensive. Similarly, MacNeille-type polarizing beamsplitters, which rely on a stack of quarter-wave layers of isotropic material oriented at Brewer's angle for one of the polarization states, and wiregrid polarizers, such as those offered by Moxtek, are relatively expensive.

One reflective polarizer that is used often in various applications is the multi-layer polymer film offered by 3M. Like wiregrid polarizers, this multi-layer polymer film is a Cartesian polarizer. In a Cartesian polarizer, the polarization of the reflected and transmitted beams of light is referenced to invariant, generally orthogonal principal axes of the Cartesian polarizer. In general, the polarization of the reflected and transmitted beams of light is substantially independent of the incident angle. Accordingly, Cartesian polarizers are often associated with good angular acceptance.

In the 3M Cartesian polarizer, the multi-layer optical film includes a stack of alternating isotropic and birefringent polymer materials. The birefringent polymer materials are typically configured substantially as A-plate retarders, while the isotropic materials are typically selected to have substantially the same index of refraction as one index of refraction of the birefringent polymer materials. Alternatively, the multi-layer optical film includes a stack of alternating birefringent polymer materials configured as A-plate retarders and C-plate retarders, respectively. Notably, the stack of alternating isotropic and/or birefringent polymer materials uses what is often referred to as Giant-Birefringence Optics (GBO) effect. Unfortunately, the alternating series of isotropic and/or birefringent layers is typically created by polymer extrusion and involves mechanically stretching the polymers to induce birefringence. As a result, the polarizing film is susceptible to photo- and thermal-induced degradation and is not ideal for use in a backward compatible BD/HD-DVD 3-wavelength OPU system.

Another example of a reflective Cartesian polarizer is based on a cholesteric liquid crystal (ChLC). In a ChLC polarizer, the ChLC molecules are ordered to form a helical structure having a pitch p. The ChLC polarizer transmits right- or left-handed circularly polarized light at a wavelength corresponding to the optical length of the pitch of the ChLC. The light that is not transmitted is reflected and is circularly polarized in the opposite helicity. In general, the ChLC material will be sandwiched between two quarter-wave retarders to convert the transmitted circularly polarized light into linearly polarized light.

ChLC reflective polarizers based on stable liquid crystal polymer (LCP) have also been proposed. LCPs are a type of polymer in which liquid crystal monomers are incorporated into the macromolecular structure along the main-chain (backbone) or as side chain units. LCPs are typically aligned via mechanically brushing or photo-alignment. In general, photo-alignment techniques typically involve first applying either a linear photo-polymerizable (LPP) film, or an azo-based dye, in a polymer alignment layer. If a LPP film is used, the LPP media is deposited on a substrate and then cured at an elevated temperature. The cured film is then subjected to polarized UV light for alignment. The alignment is then fixed with a cross-linking step. Once this photosensitive layer is aligned, the LCP layer is applied (e.g., spin-coated) over the LPP layer. As is well known in the art, the LCP layer typically includes cross-linkable liquid crystalline monomers, oligomers, or polymer precursors having cross-linkable groups. Once the LCP layer is aligned with the orientation of the LPP film, the LCP layer is then cross-linked by exposure to unpolarized UV light. Photochemical cross-linking of the alignment layer polymer and the subsequent cross-linking of the LCP molecules is expected to improve the reliability of the polarizer under high power illumination and short wavelength laser exposure.

ChLC reflective polarizers formed from stable LCP media have been used in various liquid crystal display (LCD) projection systems. In these systems, the polarizers are typically fabricated as broadband reflective polarizers, and thus are expensive relative to dichroic absorptive polarizers. In particular, the ChLC layer is typically fabricated with a highly chirped helical pitch, whereas the two more quarter-wave retarders are designed to be achromatic, so that the reflective polarizer is targeted for all of the Red, Green and Blue (RGB) wavelength channels (e.g., center wavelength ±10%). If fact, to the best knowledge of the instant inventors, ChLC reflective polarizers have not been used at the very short wavelength (e.g., 405 nm) for BD or HD-DVD channel in backward compatible CD/DVD OPU systems.

SUMMARY OF THE INVENTION

The instant invention relates to Cartesian polarizers utilizing photo-aligned liquid crystals, and more specifically to Cartesian polarizers utilizing photo-aligned liquid crystal polymers for use in optical pickup units. In general, the Cartesian polarizers are formed from a liquid crystal polymer (LCP) material that has been aligned by a photo-oriented alignment layer (e.g., a linear photo-polymerizable (LPP) film) and cross-linked into a polymer host.

According to one embodiment of the invention, the LCP molecules exhibit a cholesteric phase and are coupled to one or more quarter-wave retarders. Advantageously, the narrow band requirement (for example center wavelength ±2%) of the OPU means that a non-achromatic single-layer quarter-wave retarder and non-chirped period ChLC layer construction are sufficient, thus reducing the cost of the reflective ChLC polarizer.

According to another embodiment of the invention, the LCP molecules are used to form a multi-layer stack using the Giant-Birefringence Optics (GBO) effect. Advantageously, since cross-linked liquid crystal polymers rather than mechanical stretching provides the birefringence, the reflective polarizer is expected to exhibit improved reliability under short wavelength/high power laser exposure. Further advantageously, since the OPU system uses a narrow band of polarized light at relatively short wavelengths (e.g., 405 nm), the multi-layer stack will require relatively thin layers, and thus can be formed using spin-coating techniques rather than the polymer extrusion techniques used in the prior art.

Conveniently, these LCP-based Cartesian reflective polarizers have improved angular acceptance relative to dielectric polarizers and can be used at normal incidence.

In accordance with one aspect of the instant invention there is provided a Cartesian polarizer comprising: a transparent substrate; and at least three birefringent elements layered on a first surface of the transparent substrate, each birefringent element including: a polymeric photo-aligned alignment layer; and a cross-linked liquid crystal polymer layer, wherein the optical thickness of each of the three birefringent elements is selected such that the Cartesian polarizer transmits light at a predetermined wavelength having a first polarization, and reflects light at the predetermined wavelength having a second orthogonal polarization, the light transmitted at the predetermined wavelength emitted from a laser diode in an optical pick-up unit.

In accordance with one aspect of the instant invention there is provided a method of fabricating a Cartesian polarizer comprising the steps of: providing at least three birefringent elements layered on a transparent substrate, each birefringent element including: a polymeric photo-aligned alignment layer; and a cross-linked liquid crystal polymer layer, wherein the optical thickness of each of the three birefringent elements is selected such that the Cartesian polarizer transmits light at a predetermined wavelength having a first polarization, and reflects light at the predetermined wavelength having a second orthogonal polarization, the light transmitted at the predetermined wavelength emitted from a laser diode in an optical pick-up unit.

For the following defined terms, these definitions shall be applied, unless a different definition is given in the claims or elsewhere in this specification.

The term "birefringent" will be understood to refer to having multiple different indices of refraction. In general, birefringence causes light having orthogonal linear polarizations (e.g., S- and P-polarized light) to propagate with different velocities through a medium. This varying velocity results in a phase difference between the two orthogonal polarizations.

The term "retardance" will be understood to refer to the phase difference between two orthogonal linear polarization components. Retardance is often expressed as a fraction of a wave (e.g., in degrees or nanometers).

The term "retardation" will be understood to refer to the difference between two orthogonal indices of refraction times the thickness of the optical element. Alternatively, the term "retardation" will be understood to refer to the signed phase difference between two orthogonal linear polarization components. Notably, even within the instant application, the term "retardation" may be used interchangeably with the term "retardance".

The term "uniaxial" will be understood to refer to having two different indices of refraction (e.g., where at least two of nx, ny and nz are substantially equal).

The term "in-plane" will be understood to describe being parallel to the plane of component, such as in-plane birefringence, in-plane retardance, etc.

The term "out-of-plane" will be understood to describe being parallel to the component normal, such as out-of-plane birefringence, out-of-plane retardance, etc.

The term "in-plane retardation" will be understood to refer to the product of the difference between two orthogonal in-plane indices of refraction times the thickness of the optical element.

The term "out-of-plane retardation" will be understood to refer to the product of the difference of the index of refraction along the thickness direction (z direction) of the optical element and one in-plane index of refraction times the thickness of the optical element. Alternatively, this term will be understood to refer to the product of the difference of the index of refraction along the thickness direction (z direction) of the optical element and the average of in-plane indices of refraction times the thickness of the optical element.

The term "A-plate" will be understood to include an optical retarder with its optic or C-axis aligned parallel to the plane of the plate.

The term "C-plate" will be understood to include an optical retarder with its C-axis aligned parallel to the plate normal direction (i.e., the axis of the extraordinary refractive index $n_e$ is perpendicular to the plane of the optical retarder). A C-plate is considered to be positive if the extraordinary index $n_e$ is greater than the ordinary index $n_o$, and negative if the extraordinary index $n_e$ is less than the ordinary index $n_o$. Alternatively, a C-plate is considered to be positive if the retardance increases with angle of incidence, and negative if the retardance decreases with angle of incidence.

The term "O-plate" will be understood to include an optical retarder with its extraordinary axis (i.e., its optic axis or C-axis) oriented at an oblique angle with respect to the plane of the plate.

The term P-polarization will be understood to mean linear polarization aligned parallel to the plane of incidence.

The term S-polarization will be understood to mean linear polarization aligned orthogonal to the plane of incidence.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE INVENTION

Figure 2:
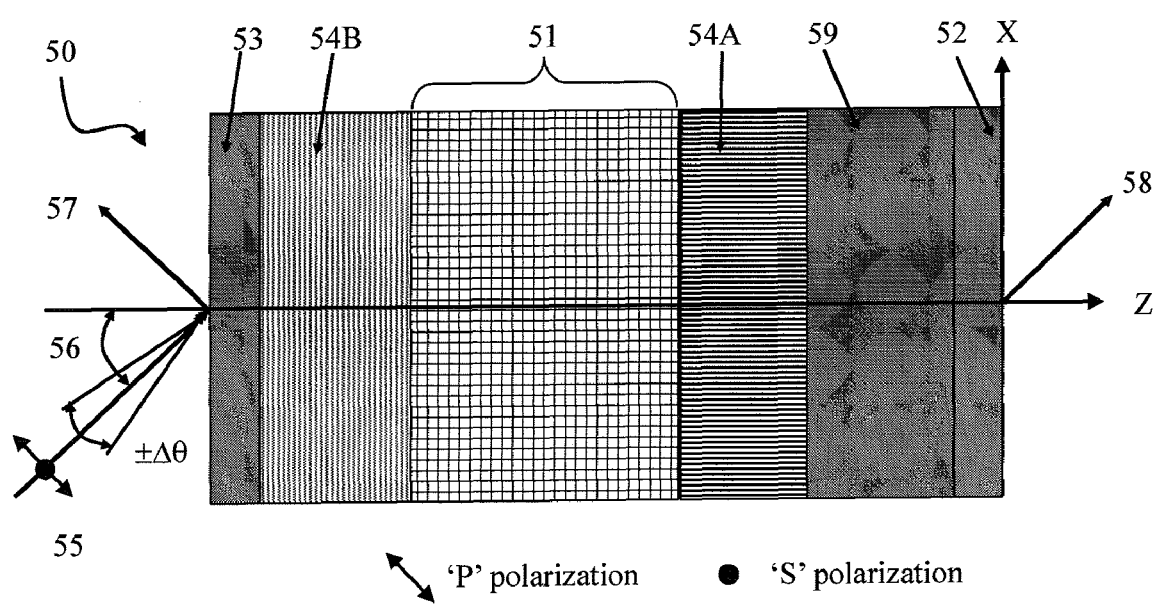
FIG. 2 is a schematic diagram of a cholesteric liquid-crystal based reflective polarizer for use in an optical pick-up in accordance with one embodiment of the instant invention.

Referring to FIG. 2, there is shown a reflective polarizer for use as a protection filter in an OPU in accordance with one embodiment of the instant invention. The reflective polarizer 50 includes a thin film layer of cholesteric liquid crystal (ChLC) 51 disposed between a first quarter-waveplate (QWP) 54B and a second QWP 54A, and coupled to a transparent substrate 59. Optional first 52 and second 53 anti-reflection (AR) coatings are disposed on the outer surfaces of the three-layer stack/assembly to improve transmission of the transmitted polarization. An optional hard coat material (e.g., lacquer, not shown) is spin-coated on the three-layer stack/assembly to provide scratch, UV-light, and moisture protection.

The three-layer QWP/ChLC/QWP stack 54A/51/54B functions as a Cartesian reflective polarizer. Each of the three layers 54A/51/54B is fabricated using photo-aligned liquid crystals. More specifically, each of the three layers 54A/51/54B is fabricated by first providing an alignment layer (e.g., a linear photo-polymerizable (LPP) film, which has been cured at an elevated temperature and subjected to polarized UV light for alignment), followed by the corresponding LCP layer. In general, each LCP layer will include cross-linkable liquid crystalline monomers, oligomers, or polymer precursors having cross-linkable groups. Once each of the LCP layers has been applied and is correctly oriented, it is then cross-linked by exposure to unpolarized UV light. Photochemical cross-linking of the alignment layer polymer and the subsequent cross-linking of the LCP molecules is expected to improve the reliability of the polarizer under high power illumination and short wavelength laser exposure.

Notably, the photo-alignment layers, each of which is adjacent to its spin-coating substrate, are not shown to simplify the illustration.

In operation, light 55 with a center wavelength and bandwidth defined, is incident on the polarizer 50 along the XZ plane with an angle of incidence θ56 with a half cone size of Δθ. The slow/fast axes of the first QWP 54B are aligned at approximately ±45° with respect to the plane of incidence of the cone center ray. The light is converted from 'S' and 'P' linear polarization (LP) into circular polarizations (CP). The handedness of the CP (either left-handed (LH) or right-handed (RH) with respect to the temporal polarization ellipse) is dictated by the alignment of the first QWP. For example, with 'S' polarization input to the first QWP, if the slow-axis of the QWP is aligned at 45° counter clockwise (CCW), with respect to the p-plane of the ChLC polarizer, a left-handed circular polarization is produced at the exit of the first QWP (with the assumption of intuitive RH-XYZ coordinate system while looking at the beam coming to the observer). Light having the opposite handedness is transmitted by the first QWP for a 'P' polarization incidence. This assumes that the Bragg reflection band of the ChLC layer is aligned to the required wavelength band. For circularly polarized light that matches the spatial handedness of the ChLC layer, this light is reflected. A cholesteric mirror operates differently than a metallic or dielectric mirror in that the reflected light is not changed in the handedness of the circular polarization (referring to the spatial handedness of both the cholesteric helical twist and the circularly polarized light beam). For example, in a RH (spatial twist) ChLC, the azimuthal angle of the LC director twists in a CCW manner as viewed from the transmitted output side. For an observer, the spatial LC twist follows a RH corkscrew (clockwise, CW). Hence, a standing wave is set-up if the ChLC film encounters a spatially CCW-circular polarization (with respect to viewing the beam). The ChLC film reflects a spatially CCW-circular or a temporally CW-circular polarization. The temporally CW-circular polarization is left-handed circularly (LHC) polarized light with respect to the RH-XYZ coordinate set.

Regardless of the circular handedness of the ChLC layer, the reflected light has its circular polarization preserved. On second pass transmission through the first QWP layer 54B, the slow-axis orientation with respect to the new RH-XYZ coordinate system is left-right inverted. Hence, the net effect of traversing the first QWP twice is negated. The reflected light recovers its linear polarization state. For the transmitted light to recover its initial linear polarization, the second QWP 54A also has to be aligned at crossed axes to the first QWP 54B. In this way, the ChLC polarizer 50 is reversible. The ChLC polarizer 50 can be configured to transmit either linear polarization.

It is noted that the cholesteric layer 50 is in general an elliptical polarizer. The ellipticity of the reflected and transmitted beams from the cholesteric layer is preferably between ±0.8 to ±1 and still more preferably between ±0.9 to ±1. Similarly, the quarter-wave retarders 54A/54B on either side of the cholesteric layer 50 merely transform linear polarization to elliptical polarization (i.e., to circular polarization in one specific case) and vice versa. The retardance is preferably within 90% of quarter-wave retardance and still more preferably within 95% of quarter-wave retardance for all wavelengths within the required band. The slow/fast axes of the polarization transforming retarder stacks are preferably aligned at ±45 degrees with a preferred tolerance of ±5 degrees, or more preferably at a tolerance of ±1%. To switch from S-polarization transmission to P-polarization transmission, the photo-aligned liquid crystal based Cartesian polarizer only has to switch the orientations of the two QWP segments while keeping the same handedness of the ChLC helix or keeping the same QWP slow/fast axes orientations and inverting the handedness of the ChLC helix. In addition, if a left- or right-handed circularly polarized light output (or more generally elliptically polarization) is required, the QWP layer/stack nearer to the exit side of the Cartesian polarizer is not required. As an inhomogeneous, non-symmetric circular polarizer, the photo-aligned LC based QWP/cholesteric LC device has the retarder layer and the polarizer layer ordered in reverse sequence than a typical circular polarizer constructed by arranging a linear reflective/absorptive polarizer before a QWP layer/stack.

In the above-described embodiment, the three-layer QWP/ChLC/QWP film is spin-coated on a first surface of the substrate 59. According to another embodiment, the three layers are distributed over more than one surface of one or two substrates. If two substrates are used, an epoxy layer is used to bond the two substrates together.

Figure 1:
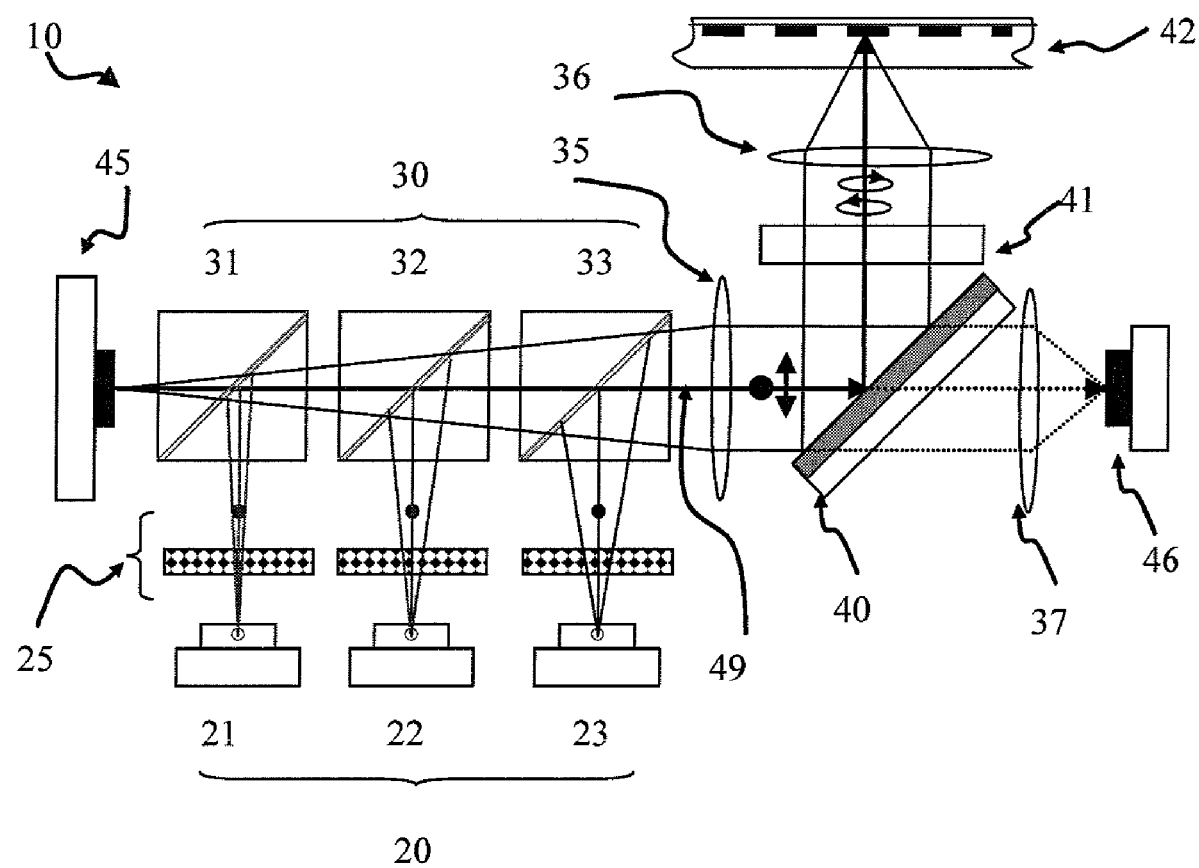
FIG. 1 shows one example of a prior-art 3-wavelength HD-DVD/DVD/CD optical pick-up system.

Notably, the reflective ChLC polarizers described in each of the above embodiments provides an economical alternative to the use of dichroic absorptive filters in optical pickup units (OPUs). More specifically, the narrow band requirement (for example center wavelength ±2%) of the protection filters used in the OPU means that a non-achromatic single-layer quarter-wave retarder and non-chirped period ChLC layer construction are sufficient, thus reducing the cost of the reflective polarizer. Moreover, the reflective ChLC polarizers used in the above-described embodiments are advantageously aligned at normal incidence with respect to the cone center axis. For example, in the OPU system described with reference to FIG. 1, the ChLC polarizer will transmit the vertical polarization ('S' with respect to the PBC hypotenuse) 58 and reflect the horizontal polarization ('P' with respect to the PBC hypotenuse) 57.

Figure 3:
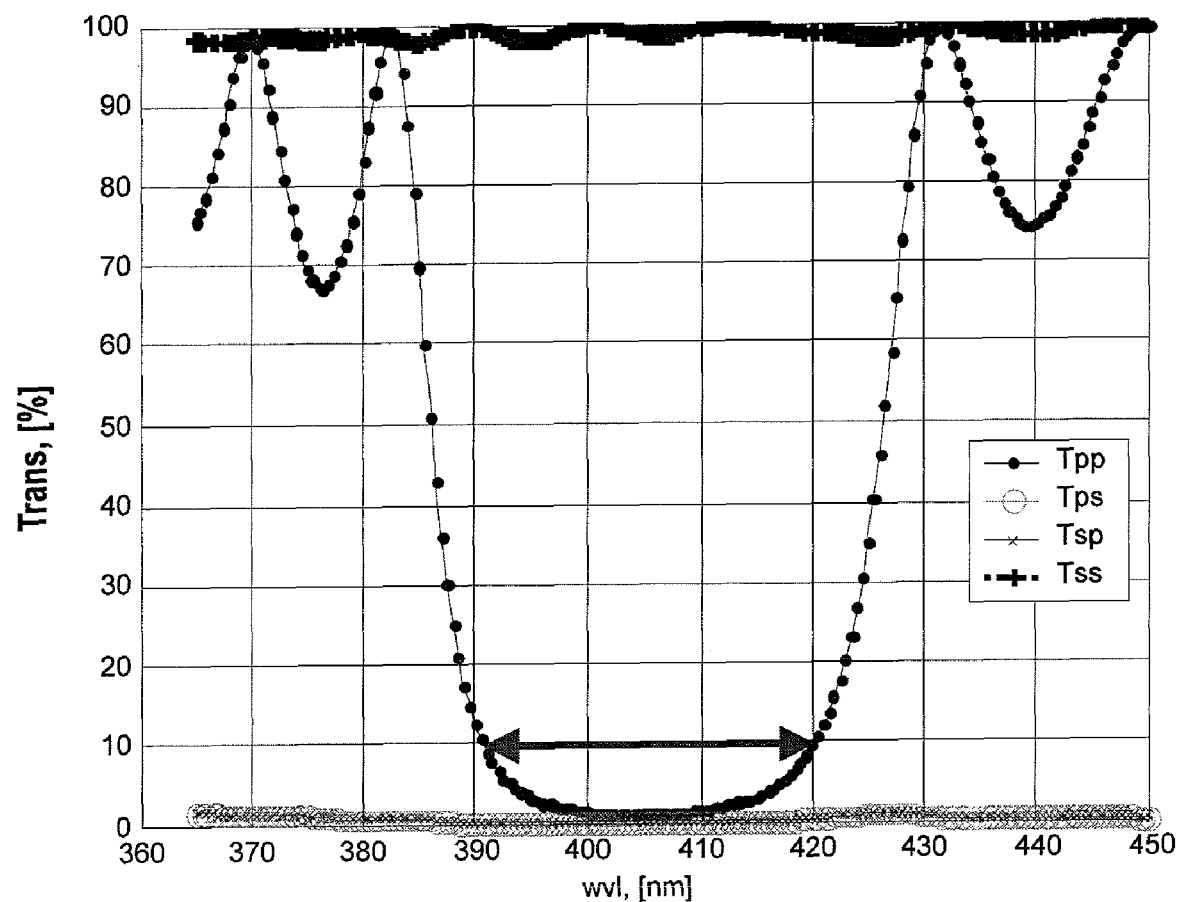
FIG. 3 illustrates the modeled transmission spectra of a non-achromatic QWP/10-period cholesteric LC/non-achromatic QWP reflective polarizer.
Figure 4:
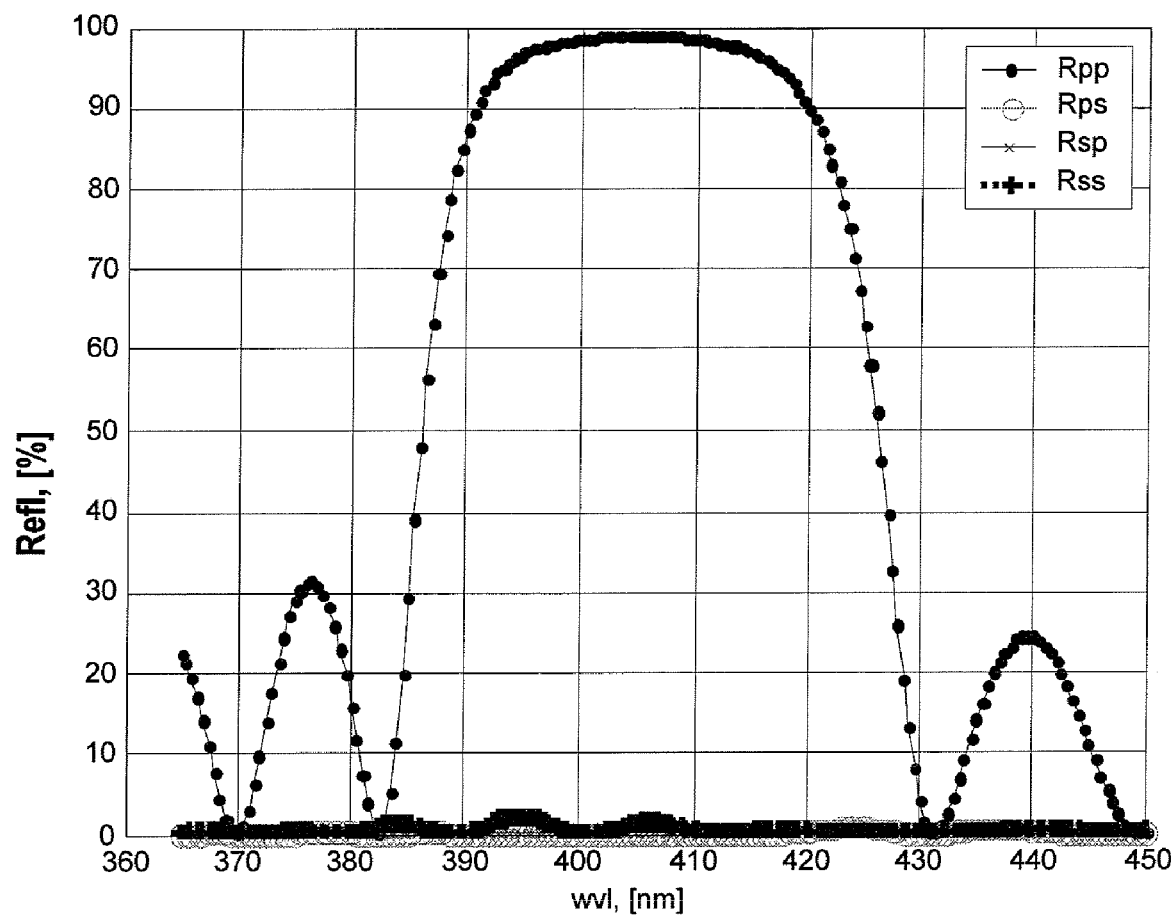
FIG. 4 illustrates the modeled reflection spectra of a non-achromatic QWP/10-period cholesteric LC/non-achromatic QWP reflective polarizer, showing a high reflectance of 'P' polarization.

Theoretical transmission and reflection spectra of a reflective polarizer similar to that shown in FIG. 2 are shown in FIGS. 3 and 4, respectively. In the model, 4×4 matrix algorithms were used to calculate the 'S' and 'P' transmittance and reflectance of a normal-incident cholesteric polarizer having 10 cholesteric pitches at 245 nm each and two quarter-wave retarders for wavelength of 405 nm (i.e., non-achromatic quarter-wave retarders). The overall thickness of the three layers (plus their respective alignment layers) was about 4 µm. Each quarter-wave layer has an LCP having $\{n_o, n_e\}$ indices of $\{1.61, 1.75\}$ whereas the ChLC has $\{n_o, n_e\}$ indices of $\{1.59, 174\}$ at the center wavelength of 405 nm. The full dispersion of these LCP mixtures was utilized in the numerical model. FIG. 3 illustrates the transmission spectrum of the QWP/ChLC/QWP polarizer, evaluated at ±7° half cone angle, whereas FIG. 4 illustrates the reflectance spectrum of the QWP/ChLC/QWP polarizer, evaluated at ±7° half cone angle. Clearly, this polarizer easily meets the 10:1 polarization contrast of a laser diode protection filter over ±2% of bandwidth (397 nm to 413 nm wavelength range). Notably, the on-axis spectra are very similar to the 7-degree cone-average spectra, confirming the good angular acceptance generally associated with Cartesian polarizers.

In the above-described embodiments, the LCP molecules exhibit a cholesteric phase and are coupled to one or more quarter-wave retarders. According to other embodiments of the instant invention, the LCP molecules are used to form a multi-layer stack using the GBO effect.

Giant Birefringent Optics (GBO) were first discussed with respect to multi-layer mirrors, which maintain or increase their reflectivity with increasing angles of incidence when the mirrors are fabricated using polymers that exhibit a large birefringence in their indices of refraction (e.g., see Weber et al. "Giant birefringent optics in multi-layer polymer mirrors," Science, 287, pp. 2451-2456, 2000, which is hereby incorporated by reference). The GBO effect was thought to be a significant advancement in optical design in that the Brewster angle (i.e., the angle at which reflectance of P-polarized light goes to zero) of a coated substrate can be arbitrary tailored, and in particular, can be designed to be very large or even non-existent. Accordingly, a light beam incident at an angle no longer has to transmit predominantly 'P' polarization at around the Brewster angle condition and reflect predominantly 'S' polarization. Instead, the transmitted and reflected polarization can be set by the alignment of the film. In other words, the plane of incidence is decoupled from the transmitted and reflected polarization axes.

The main drawbacks of a GBO polarizer are bandwidth and reflectivity. In both conventional dielectric thin films and GBO films, a high reflector is typically designed as a quarter-wave (QW) stack. A convenient metric to track the bandwidth is to define the two wavelength points between which the reflectance increases as more QW optical thickness layers are added, $$\frac{\Delta \lambda}{\lambda_0} \approx \frac{4}{\pi} \sin^{-1}\left(\frac{n_2 - n_1}{n_2 + n_1}\right) \qquad (1)$$

where $\Delta\lambda/\lambda_0$ is the approximate fractional bandwidth, and $\{n_1, n_2\}$ are the indices of refraction for the two QW layers at the center wavelength $\lambda_0$.

If the QW stack includes alternating layers of silica/tantala with a center wavelength of 550 nm, the fractional bandwidth will be about 26%, assuming indices of 1.46 and 2.2 for silica and tantala, respectively. Conversely a uniaxial birefringent QW stack has approximately 4% fractional bandwidth, assuming ordinary and extraordinary indices of 1.5 and 1.6, respectively. Even a very high birefringence material of $\{1.50, 1.80\}$ has a mere 11.5% fractional bandwidth. The lack of bandwidth is typically addressed by progressively changing the QW thickness (e.g., chirping the QW thickness, which effectively changes the wavelength centers of the QW segments).

The reflectivity is related to the voltage standing wave ratio, V, by, $$R = \left(\frac{V-1}{V+1}\right)^2 \qquad (2)$$

where, V for a $n_a/\text{H}(\text{LH})^{p-1}/n_s$ QW stack design is, $$V = \left(\frac{n_H}{n_L}\right)^{2p} \cdot \frac{n_L}{n_s} \cdot \frac{n_L}{n_a}, \qquad (3)$$

$\{n_L, n_H\}$ are the low and high indices of refraction for the QW layers, 'L' and 'H' respectively, $\{n_a, n_s\}$ are the ambient and substrate indices, and p is the number of 'H' QW layers in the stack. For the above-described tantala/silica dielectric stack, the index contrast $n_H/n_L$ is approx. 1.5. In comparison, the above-described conventional uniaxial birefringent stack has an index contrast of 1.07 to 1.2. In other words, the GBO stack requires many more layers to provide adequate reflectance.

Figure 5:
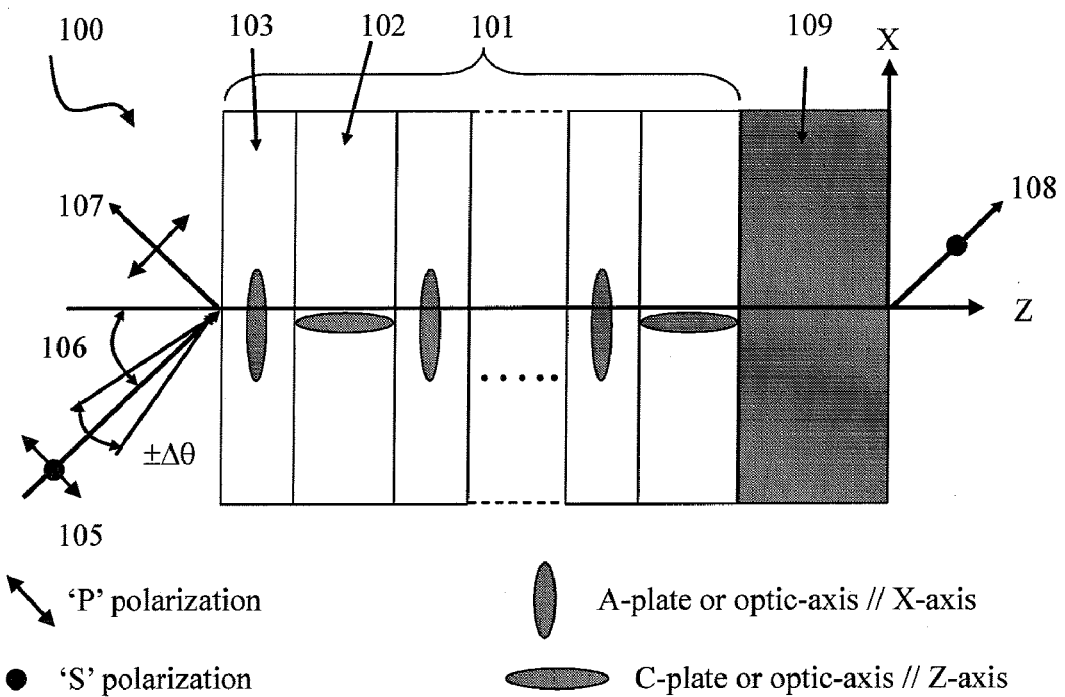
FIG. 5 is a schematic diagram of a multi-layer GBO S-polarizer in accordance with an embodiment of the instant invention, including a plurality of alternating A-plate/C-plate elements, where the A-plate elements have their slow axes oriented along X-axis.

Referring to FIG. 5, there is shown a reflective polarizer for use as a protection filter in an OPU in accordance with an embodiment of the instant invention, based on the GBO effect. The reflective polarizer 100, which has an alternating A-plate/C-plate configuration, includes a stack of QW photo-aligned birefringent elements 101 disposed on a first surface of a transparent substrate 109. The QW stack 101 includes a first plurality of elements including a first birefringent material alternating with a second plurality of elements including a second birefringent material. Each element (e.g., 103) in the first plurality of elements has a first physical thickness $d_1$, a first birefringent index set of $\{n_{1o}, n_{1e}\}$, and is oriented as an A-plate retarder with its optic axis parallel to the X-axis. Each element (e.g., 102) in the second plurality of elements has a second physical thickness $d_2$, a second birefringent index set of $\{n_{2o}, n_{2e}\}$, and is oriented as a C-plate retarder with the optic axis parallel to the Z-axis. Each element in the first and second plurality elements are optical retarders. The optical thickness of each element in the first and second plurality of birefringent elements corresponds to approximately a QW at the nominal angle of incidence θ at the cone center and at the nominal center wavelength.

In operation, light 105 with a center wavelength and a bandwidth defined is incident on the reflective polarizer 100 along the XZ plane at an angle θ 106, with a half cone size of Δθ. With the orientations of the two constituent retarders shown in device 100, the S-polarization is predominantly transmitted 108 whereas the P-polarization is predominantly reflected 107. Accordingly, this reflective polarizer is referred to as an S-polarizer.

Figure 6:
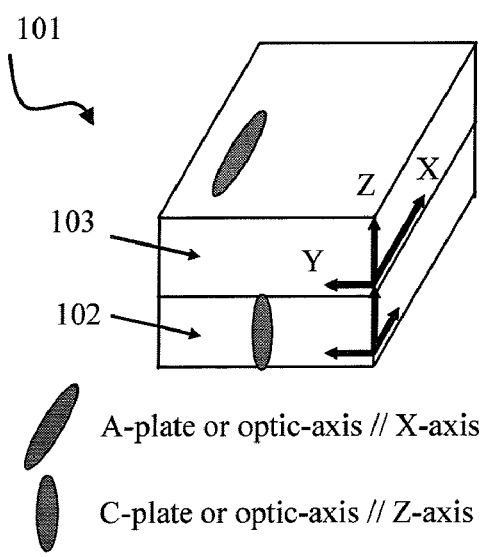
FIG. 6 is a perspective view of a base unit of the S-polarizer illustrated in FIG. 5.

A 3-D perspective view of a base unit of the S-polarizer 100 is illustrated in FIG. 6. The base unit, which includes a first optical retarder element 103 and a second optical retarder element 102, is configured to have halfwave optical thickness (HWOT) at the nominal angle of incidence θ at the cone center and at the nominal center wavelength. For a positive uniaxial material configured as A-plates in the first plurality of elements and C-plates in the second plurality of elements (e.g., as shown in FIG. 5), the half-wave optical thickness (HWOT) is calculated using the ordinary and extraordinary indices of the first and second birefringent materials and the center wavelength $\lambda_0$ according to $$d_1 \frac{n_{1e}}{n_{1o}} \sqrt{(n_{1o})^2 - \sin^2(\theta)} + d_2 \frac{n_{2o}}{n_{2e}} \sqrt{(n_{2e})^2 - \sin^2(\theta)} = \lambda_0/2, \quad (4)$$

where $n_{1e} = n_{2e}$, $n_{1o} = n_{2o}$ and $n_{1e} > n_{1o}$. Similarly, for a negative uniaxial configured as A-plates in the plurality of first elements and C-plates in the second plurality of elements (disc-like index indicatrix, not shown here), the HWOT is also calculated using ordinary and extraordinary indices of first and second birefringent materials using Eq. (4), however, these are related by $n_{1e} = n_{2e}$, $n_{1o} = n_{2o}$ and $n_{1e} < n_{1o}$.

In general, any two uniaxial and/or biaxial birefringent layers can be used as the first and second birefringent materials in the base unit. Optionally, the center wavelength of successive repeat units is varied across the thickness of the polarizer (e.g., the HWOT is chirped such that the center wavelength of the repeat unit closer to the entrance to the film is shorter and the center wavelength of the repeat unit closer to the substrate is longer, and vice versa). A typical chirp fraction is less than ±10% for the outermost repeat units when compared to the central repeat unit.

As a Cartesian S-polarizer, the first and second birefringent materials will exhibit an index difference in the P-plane and have nearly matched indices in the S-plane. The quarter-wave optical thickness (QWOT) is calculated for both the first and plurality of second elements along the P-plane (i.e., according to a high reflector QW stack). The z-direction indices of the plurality of first and second elements affect the off-normal polarizer performance and its angular bandwidth. Accordingly, the first and second birefringent materials should be judiciously selected for the target performance.

Note that a Cartesian reflective polarizer, such as the alternating A/C-plate polarizer illustrated in FIG. 5, does not bind the transmission and reflection polarization axis to be parallel or orthogonal to the plane of incidence. For the purpose of illustrating the invention, the P-plane is parallel to the system XZ plane, which is parallel to the plane of drawing in FIG. 5. Similarly, the S-plane is parallel to the system YZ plane and it is perpendicular to the plane of drawing in FIG. 5.

In the embodiment described with reference to FIGS. 5 and 6, the A-plate elements have their optic axes aligned parallel to the X-axis. Alternatively, the polarizer may be configured such that the A-plate elements have their optic axes aligned parallel to the Y-axis.

Figure 7:
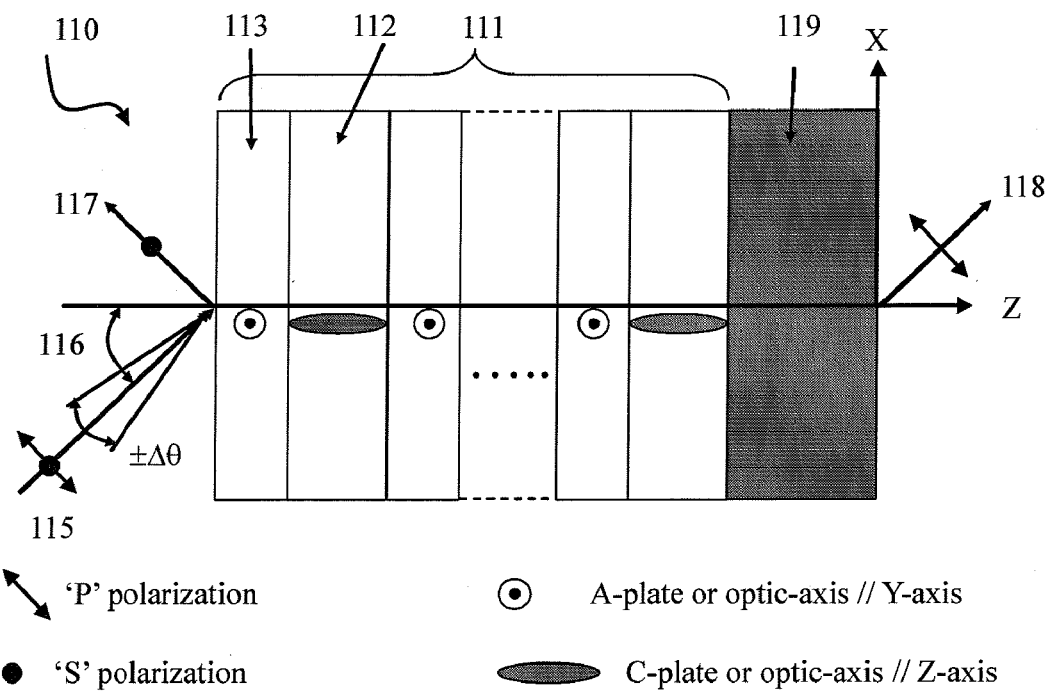
FIG. 7 is a schematic diagram of a multi-layer GBO P-polarizer in accordance with an embodiment of the instant invention, including a plurality of alternating A-plate/C-plate elements, where the A-plate elements have their slow axes oriented along Y-axis.

Referring to FIG. 7, there is shown a reflective polarizer for use as a protection filter in an OPU in accordance with another embodiment of the instant invention, based on the GBO effect. The reflective polarizer 110, which has an alternating A-plate/C-plate configuration, includes a stack of QW photo-aligned birefringent elements 111 disposed on a first surface of a transparent substrate 119. The QW stack 111 includes a first plurality of elements formed from a first birefringent material alternating with a second plurality of elements formed from a second birefringent material. Each element (e.g., 113) in the first plurality of elements has a first physical thickness $d_1$, a first birefringent index set of $\{n_{1o}, n_{1e}\}$, and is oriented as an A-plate retarder with its optic axis parallel to the Y-axis. Each element (e.g., 112) in the second plurality of elements has a second physical thickness $d_2$, a second birefringent index set of $\{n_{2o}, n_{2e}\}$, and is oriented as a C-plate retarder with the optic axis parallel to the Z-axis. Each element in the first and second plurality elements are optical retarders. The optical thickness of each element in the first and second plurality of birefringent elements corresponds to approximately a QW at the nominal angle of incidence θ at the cone center and at the nominal center wavelength.

In operation, light 115 with a center wavelength and a bandwidth defined is incident on the reflective polarizer 110 along the XZ plane at an angle θ 116, with a half cone size of Δθ. With the orientations of the two constituent retarders shown in device 110, the P-polarization is predominantly transmitted 118 whereas the S-polarization is predominantly reflected 117. Accordingly, this reflective polarizer is referred to as a P-polarizer.

Figure 8:
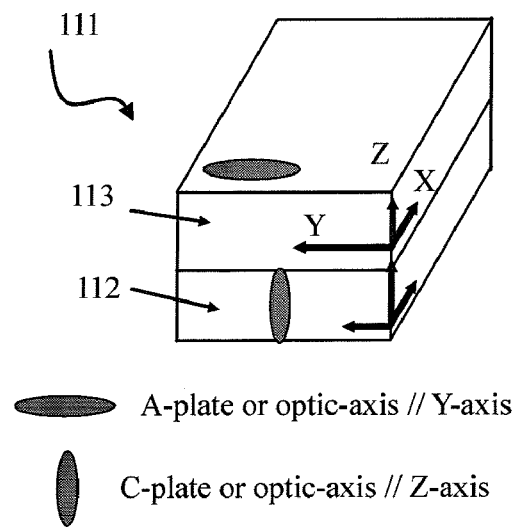
FIG. 8 is a perspective view of a base unit of the P-polarizer illustrated in FIG. 7.

A 3-D perspective view of a base unit of the P-polarizer 110 is illustrated in FIG. 8. The base unit, which includes a first optical retarder element 113 and a second optical retarder element 112, is configured to have halfwave optical thickness (HWOT) at the nominal angle of incidence θ at the cone center and at the nominal center wavelength. For a positive uniaxial material configured as A-plates in the first plurality of elements and C-plates in the second plurality of elements (e.g., as shown in FIG. 7), the half-wave optical thickness (HWOT) is calculated using the ordinary and extraordinary indices of the first and second birefringent materials and the center wavelength $\lambda_0$ according to $$d_1 \sqrt{(n_{1e})^2 - \sin^2(\theta)} + d_2 \sqrt{(n_{2o})^2 - \sin^2(\theta)} = \lambda_0/2, \quad (5)$$

where $n_{1e} = n_{2e}$, $n_{1o} = n_{2o}$ and $n_{1e} > n_{1o}$. Similarly, for a negative uniaxial configured as A-plates in the plurality of first elements and C-plates in the second plurality of elements (disc-like index indicatrix, not shown here), the HWOT is also calculated using ordinary and extraordinary indices of first and second birefringent materials using Eq. (5), however, these are related by $n_{1e}=n_{2e}$, $n_{1o}=n_{2o}$ and $n_{1e}<n_{1o}$. In the case of a P-polarizer, the S-polarization is always tangential to the layer interfaces. Hence, the phase thickness of each element utilizes an expression similar to an isotropic layer.

In general, any two uniaxial and/or biaxial birefringent layers can be used as the first and second birefringent materials in the base unit. Optionally, the center wavelength of successive repeat units is varied across the thickness of the polarizer (e.g., the HWOT is chirped such that the center wavelength of the repeat unit closer to the entrance to the film is shorter and the center wavelength of the repeat unit closer to the substrate is longer, and vice versa). A typical chirp fraction is less than ±10% for the outermost repeat units when compared to the central repeat unit.

In each of the S- and P-polarizers discussed with reference to FIGS. 5 and 7, respectively, the A-plate elements are illustrated with their optic axes aligned parallel to the X-axis or the Y-axis. In practice, both the A-plate and the C-plate retarder elements may not be aligned with their optic axes oriented truly in the plane of the substrate and orthogonal to the plane of the substrate, for the A-plate and C-plate retarder, respectively. In this situation, the photo-aligned, photo-cured Cartesian polarizer is more generally represented by alternating small-angle tilt O-plate and large-angle tilt O-plate elements.

Figure 9:
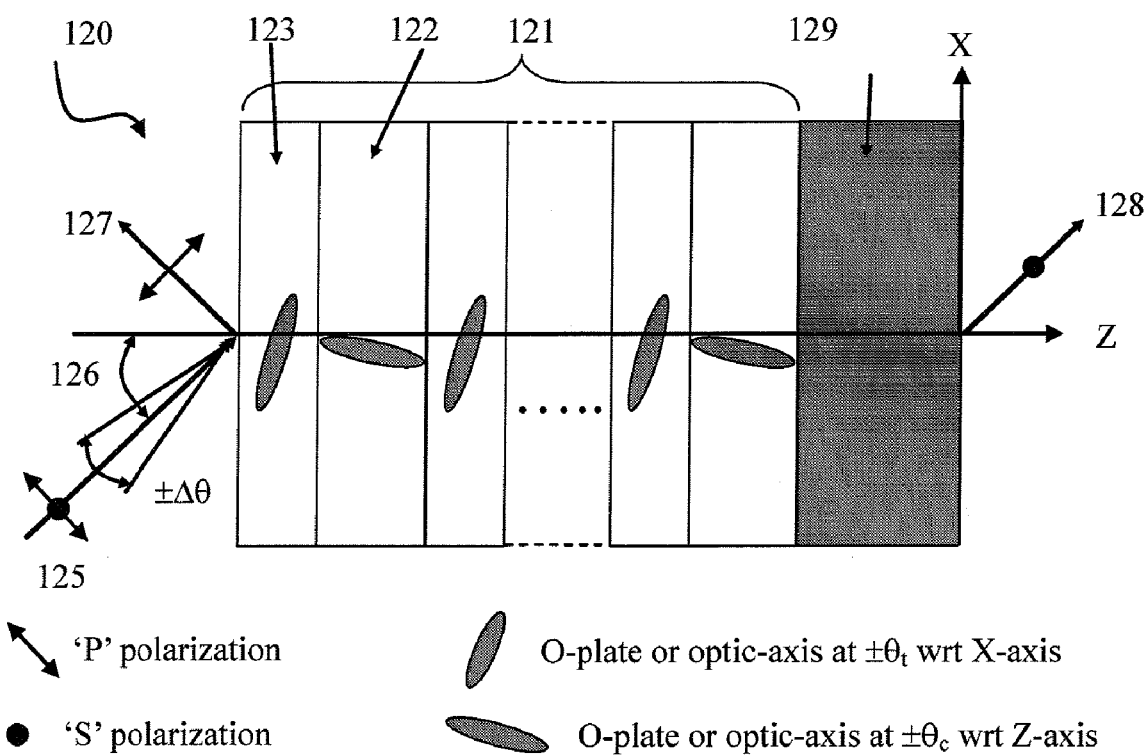
FIG. 9 is a schematic diagram of a multi-layer GBO S-polarizer in accordance with an embodiment of the instant invention, including a plurality of alternating O-plate/O-plate elements.

Referring to FIG. 9, there is shown a reflective polarizer for use as a protection filter in an OPU in accordance with another embodiment of the instant invention, based on the GBO effect. The reflective polarizer 120, which has an alternating O-plate/O-plate configuration, includes a stack of QW photo-aligned birefringent elements 121 disposed on a first surface of a transparent substrate 129. The QW stack 121 includes a first plurality of elements formed from a first birefringent material alternating with a second plurality of elements formed from a second birefringent material. Each element (e.g., 123) in the first plurality of elements has a first physical thickness $d_1$, a first birefringent index set of $\{n_{1o}, n_{1e}\}$, and is oriented as an O-plate retarder with its optic axis forming an acute angle with the plane of the substrate by less than 45 degrees, and with its optic axis being parallel to the XZ coordinate plane. Each element (e.g., 122) in the second plurality of elements has a second physical thickness $d_2$, a second birefringent index set of $\{n_{2o}, n_{2e}\}$, and is oriented as a O-plate retarder with the optic axis forming an acute angle with the plane of the substrate by more than 45 degrees, and with its optic axis either parallel or perpendicular to the XZ plane. Each element in the first and second plurality elements are optical retarders. The optical thickness of each element in the first and second plurality of birefringent elements corresponds to approximately a QW at the nominal angle of incidence $\theta$ at the cone center and at the nominal center wavelength.

In operation, light 125 with a center wavelength and a bandwidth defined is incident on the reflective polarizer 120 along the XZ plane at an angle $\theta$ 126, with a half cone size of $\Delta\theta$. With the orientations of the two constituent retarders shown in device 120, the S-polarization is predominantly transmitted 128 whereas the P-polarization is predominantly reflected 127. Accordingly, this reflective polarizer is referred to as a S-polarizer.

The deviation of the optical axis for the first plurality of retarder elements and the second plurality of retarder elements from the plane of the substrate and the normal to the substrate, respectively, is less than 45 degrees, more preferably less than 15 degrees and still more preferably less than 5 degrees. In general, the deviation in the optic axis alignment is an artifact of the photo-aligned, photo-cured manufacturing process and is a parameter of the birefringent and photo-alignment materials used. While the effective indices of these birefringent elements with tilted optic axes along the system XYZ coordinates for a off-normal incidence light is more involved, it can be suitably evaluated with a 4×4 matrix based calculation algorithm, wherein the indices for normal incident light are calculated from, $$\frac{1}{[n_{1x}(\theta_{1t})]^2} = \frac{\cos^2(\theta_{1t})}{n_{1e}^2} + \frac{\sin^2(\theta_{1t})}{n_{1o}^2}, \quad (6a)$$

$$n_{1y} = n_{1o}, \quad (6b)$$

$$\frac{1}{[n_{1z}(\theta_{1t})]^2} = \frac{\sin^2(\theta_{1t})}{n_{1e}^2} + \frac{\cos^2(\theta_{1t})}{n_{1o}^2}, \text{ and} \quad (6c)$$

where $\theta_{1t}$ is the out-of-plane tilt of the optic axis for the plurality of first retarder elements, and $(n_{1x}, n_{1y}, n_{1z})$ are the resultant refractive indices of the O-plate along the principal X-, Y-, and Z-axes. A similar set of $(n_{2x}, n_{2y}, n_{2z})$ expressions can be found for the second plurality of retarder elements. At normal incidence, the HWOT is obtained when, $$d_1 n_{1x} + d_2 n_{2x} = \lambda_0/2, \quad (7)$$

and when the indices along the S-plane are nearly matched, i.e., $n_{2y} \approx n_{1y}$.

In general, any two uniaxial and/or biaxial birefringent layers can be used as the first and second birefringent materials in the base unit. Optionally, the center wavelength of successive repeat units is varied across the thickness of the polarizer (e.g., the HWOT is chirped such that the center wavelength of the repeat unit closer to the entrance to the film is shorter and the center wavelength of the repeat unit closer to the substrate is longer, and vice versa). A typical chirp fraction is less than ±10% for the outermost repeat units when compared to the central repeat unit.

In the embodiment described with reference to FIG. 9, alternating small-angle tilt O-plate elements and large-angle tilt O-plate elements form an S-polarizer. Alternatively, the alternating small-angle tilt O-plate elements and large-angle tilt O-plate elements can form a P-polarizer.

Figure 10:
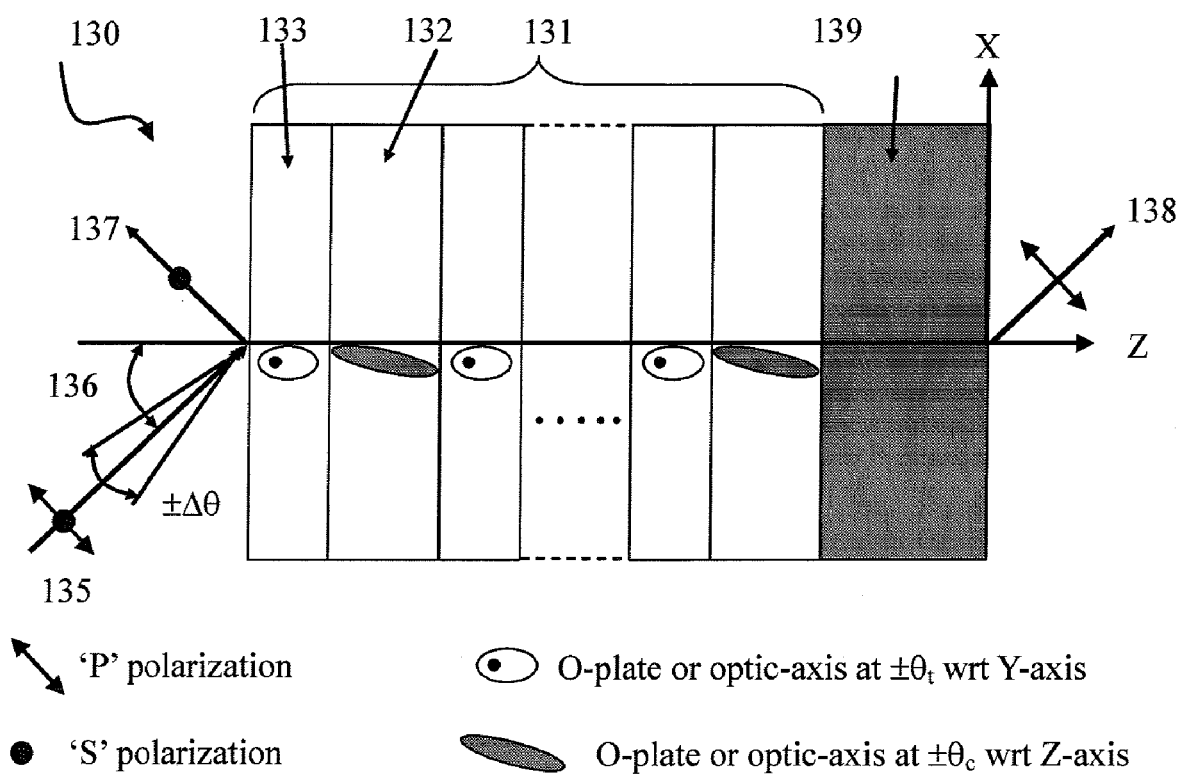
FIG. 10 is a schematic diagram of a multi-layer GBO P-polarizer in accordance with an embodiment of the instant invention, including a plurality of alternating O-plate/O-plate elements.

Referring to FIG. 10, there is shown a reflective polarizer for use as a protection filter in an OPU in accordance with another embodiment of the instant invention, based on the GBO effect. The reflective polarizer 130, which has an alternating O-plate/O-plate configuration, includes a stack of QW photo-aligned birefringent elements 131 disposed on a first surface of a transparent substrate 139. The QW stack 131 includes a first plurality of elements formed from a first birefringent material alternating with a second plurality of elements formed from a second birefringent material. Each element (e.g., 133) in the first plurality of elements has a first physical thickness $d_1$, a first birefringent index set of $\{n_{1o}, n_{1e}\}$, and is oriented as an O-plate retarder with its slow axis in the YZ plane. Each element (e.g., 132) in the second plurality of elements has a second physical thickness $d_2$, a second birefringent index set of $\{n_{2o}, n_{2e}\}$, and is oriented as an O-plate retarder oriented parallel or perpendicular to the XZ plane (parallel is shown). Note that each O-plate (e.g., 133) in the first plurality of elements has a larger in-plane retardation component than an out-of-plane component, while each O-plate (e.g., 132) in the second plurality of elements has a larger out-of-plane retardation component then in-plane retardation component.

In operation, light 135 with a center wavelength and a bandwidth defined is incident on the reflective polarizer 130 along the XZ plane at an angle θ 136, with a half cone size of Δθ. With the orientations of the two constituent retarders shown in device 130, the P-polarization is predominantly transmitted 138 whereas the S-polarization is predominantly reflected 137. Accordingly, this reflective polarizer is referred to as a P-polarizer.

The deviation of the optic axis for the first plurality of retarder elements and the second plurality of retarder elements from the plane of substrate and the normal to the substrate, respectively, is less than 45 degrees, more preferably less than 15 degrees, and still more preferably less than 5 degrees. This deviation in the optic axis alignment is an artifact of the photo-aligned, photo-cured manufacturing process and is a parameter of the birefringent and photo-alignment materials used. While the effective indices of these birefringent elements with tilted optic axes along the system XYZ coordinates for a off-normal incidence light is more involved, it can be suitably evaluated with a 4×4 matrix based calculation algorithm, wherein the indices for normal incident light is given as, $$n_{1x} = n_{1o}, \quad (7a)$$

$$\frac{1}{[n_{1y}(\theta_{1t})]^2} = \frac{\cos^2(\theta_{1t})}{n_{1e}^2} + \frac{\sin^2(\theta_{1t})}{n_{1o}^2}, \quad (7b)$$

$$\frac{1}{[n_{1z}(\theta_{1t})]^2} = \frac{\sin^2(\theta_{1t})}{n_{1e}^2} + \frac{\cos^2(\theta_{1t})}{n_{1o}^2}, \text{ and} \quad (7c)$$

where $\theta_{1t}$ is the out-of-plane tilt of the optic axis for the plurality of first retarder elements, $(n_{1x}, n_{1y}, n_{1z})$ are the resultant refractive indices of the O-plate along the principal X-, Y-, and Z-axis. Similar set of $(n_{2x}, n_{2y}, n_{2z})$ expressions can be found for the second plurality of retarder elements. At normal incidence, the HWOT is obtained when, $$d_1 n_{1y} + d_2 n_{2y} = \lambda_0/2, \quad (8)$$

and when the indices along the P-plane are nearly matched, i.e., $n_{2x} \approx n_{1x}$.

In general, any two uniaxial and/or biaxial birefringent layers can be used as the first and second birefringent materials in the base unit. Optionally, the center wavelength of successive repeat units is varied across the thickness of the polarizer (e.g., the HWOT is chirped such that the center wavelength of the repeat unit closer to the entrance to the film is shorter and the center wavelength of the repeat unit closer to the substrate is longer, and vice versa). A typical chirp fraction is less than ±10% for the outermost repeat units when compared to the central repeat unit.

In each of the embodiments illustrated and/or discussed with reference to FIGS. 5, 7, 9, and 10, each A-plate, C-plate and/or O-plate requires a dedicated alignment layer, which is omitted from the figures for illustrative purposes. The photochemistry for each alignment layer is the same or different for different layer materials/orientations.

Figure 11:
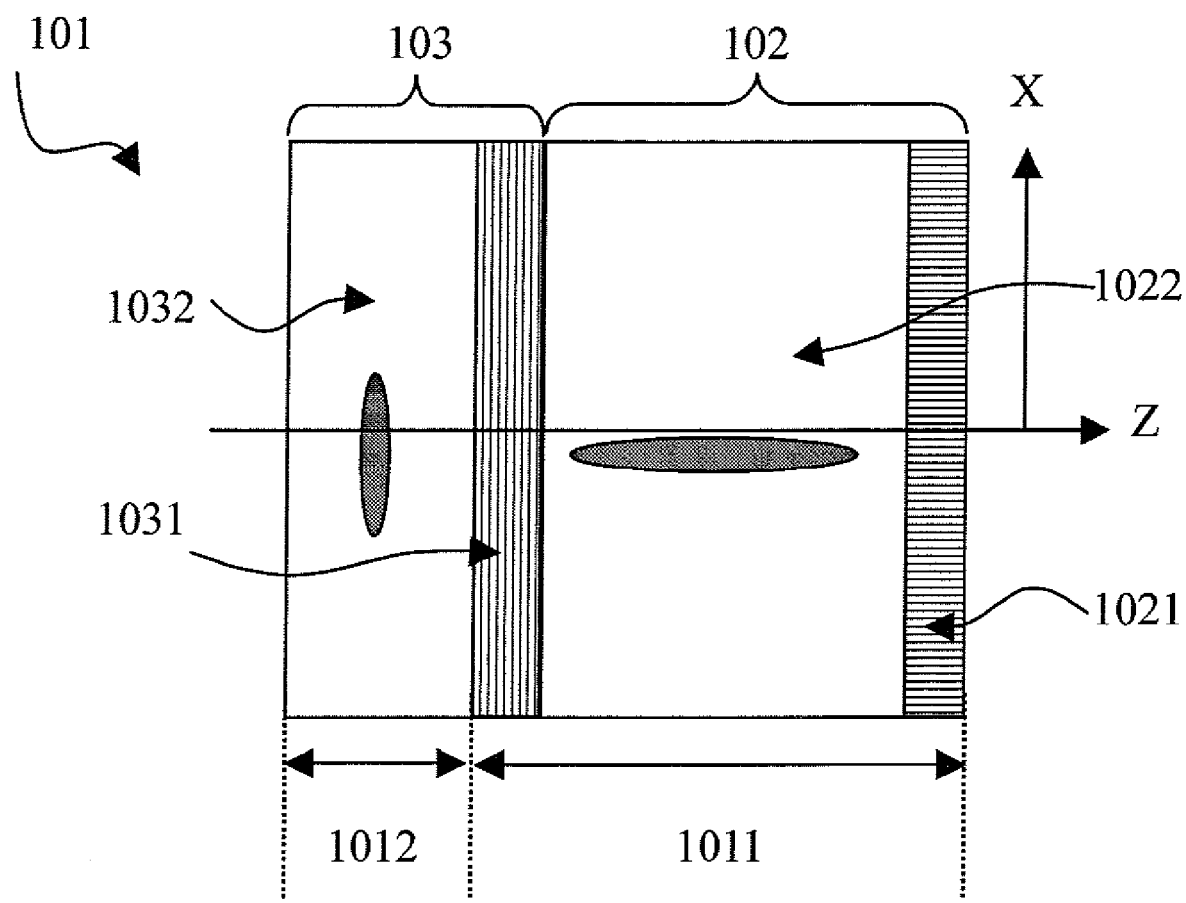
FIG. 11 is a schematic diagram of the base unit of the S-polarizer illustrated in FIG. 5, showing the alignment layers.
Figure 11:
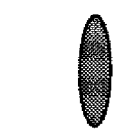
Figure 11:

Referring to FIG. 11, a schematic diagram of the base unit of the S-polarizer 100 illustrated in FIG. 5 including the alignment layers is shown. The base unit 101 includes the first A-plate optical retarder element 103 and the second C-plate optical retarder element 102. The A-plate retarder element 103 includes a birefringent layer 1032, which has a first physical thickness $d_1$, a first birefringent index set of $\{n_{1o}, n_{1e}\}$, and is oriented as an A-plate retarder with the optic axis parallel to the X-axis, and a non-birefringent (or very weakly birefringent) layer 1031, which has a third layer thickness $d_3$ and a third isotropic index of refraction $n_3$. This layer 1031 is used to orient (align) the A-plate layer 1032 upon photo-exposure. Similarly, the C-plate retarder element 102 includes a birefringent layer 1022, which has a second physical thickness $d_2$, a second birefringent index set of $\{n_{2o}, n_{2e}\}$, and is oriented as a C-plate retarder with the optic axis parallel to the Z-axis, and a non-birefringent (or very weakly birefringent) layer 1021, which has a fourth layer thickness $d_4$ and fourth isotropic index of refraction $n_4$. This layer 1021 is used to orient (align) the C-plate layer 1022 upon photo-exposure.

The base unit 101 is configured to have halfwave optical thickness (HWOT) at the nominal angle of incidence θ at the cone center and at the nominal center wavelength. More specifically, the optical thicknesses of layers 1032, 1031, 1022 and 1021 sum to a HWOT at the nominal angle of incidence θ at the cone center and at the nominal center wavelength, as given by:

$$d_1 \frac{n_{1e}}{n_{1o}} \sqrt{(n_{1o})^2 - \sin^2(\theta)} + d_2 \frac{n_{2o}}{n_{2e}} \sqrt{(n_{2e})^2 - \sin^2(\theta)} + \quad (9)$$
$$d_3 \sqrt{(n_3)^2 - \sin^2(\theta)} + d_4 \sqrt{(n_4)^2 - \sin^2(\theta)} = \lambda_0/2,$$

where θ is the angle of incidence in air; for incidence in immersed medium of refractive index $n_a$, $\sin(\theta)$ is replaced by $n_a \sin(\theta)$.

In practice, the third 1031 and forth 1021 isotropic layers, when disposed on either side of the C-plate layer 1022 modifies the equivalent index of the triplet of layers. If the two alignment layers 1031/1021 are formed from the same materials, as for example applied in typical photo-aligned, photo-cured retarder fabrication process, the triplet of layers 1031/1022/1021 can be approximated as a Herpin equivalent QW layer 1011. If the birefringent A-plate layer 1032 and birefringent C-plate layer 1022 utilize the same materials at orthogonal optic-axis alignment, one has to take care to use very thin alignment layers 1031 and 1021. As an example, if the birefringent layers 1032/1022 are LCP materials having $\{n_{1o}, n_{1e}\}$ and $\{n_{2o}, n_{2e}\}$ of $\{1.61, 1.75\}$ at λ=405 nm and the alignment layers 1012/1021 are isotropic polymers with $n_3 = n_4$ of 1.69 at λ=405 nm, a mere 5 nm alignment layer thickness (at either side of the C-plate 1022) changes the on-axis effective index of the triplet to 1.615, while an approximately 10 nm alignment layer thickness (at either side of the C-plate 1022) changes the on-axis effective index of the triplet to 1.63. The Herpin index of the triplet has to be nominally matched to the ordinary refractive index of the A-plate layer if the polarizer operates at normal incidence. Similarly, the equivalent index of the triplet is also nominally matched to the effective index of the A-plate at angle for a polarizer operating at off-normal incidence. Accordingly, a slight mismatch in indices translates into loss in the transmitted polarization (e.g., S-polarization).

Base units similar to that illustrated in FIG. 11 can be described for the polarizers described with reference to FIGS. 7, 9, and 10, with the understanding that the configuration of the birefringent layers can be a combination of A-plate, C-plate and/or O-plates. For example, in the embodiment illustrated in FIG. 11, the A-plate layer can be an O-plate with a small out-of-plane tilt, such that the in-plane retardation component of the layer is larger than its out-of-plane retardation component and/or the C-plate layer can be an O-plate with a very large out-of-plane tilt, such that the out-of-plane retardation component is larger than its in-plane retardation component. In each case, the base unit of two retarder elements is repeated to provide the corresponding polarizer.

Figure 12:
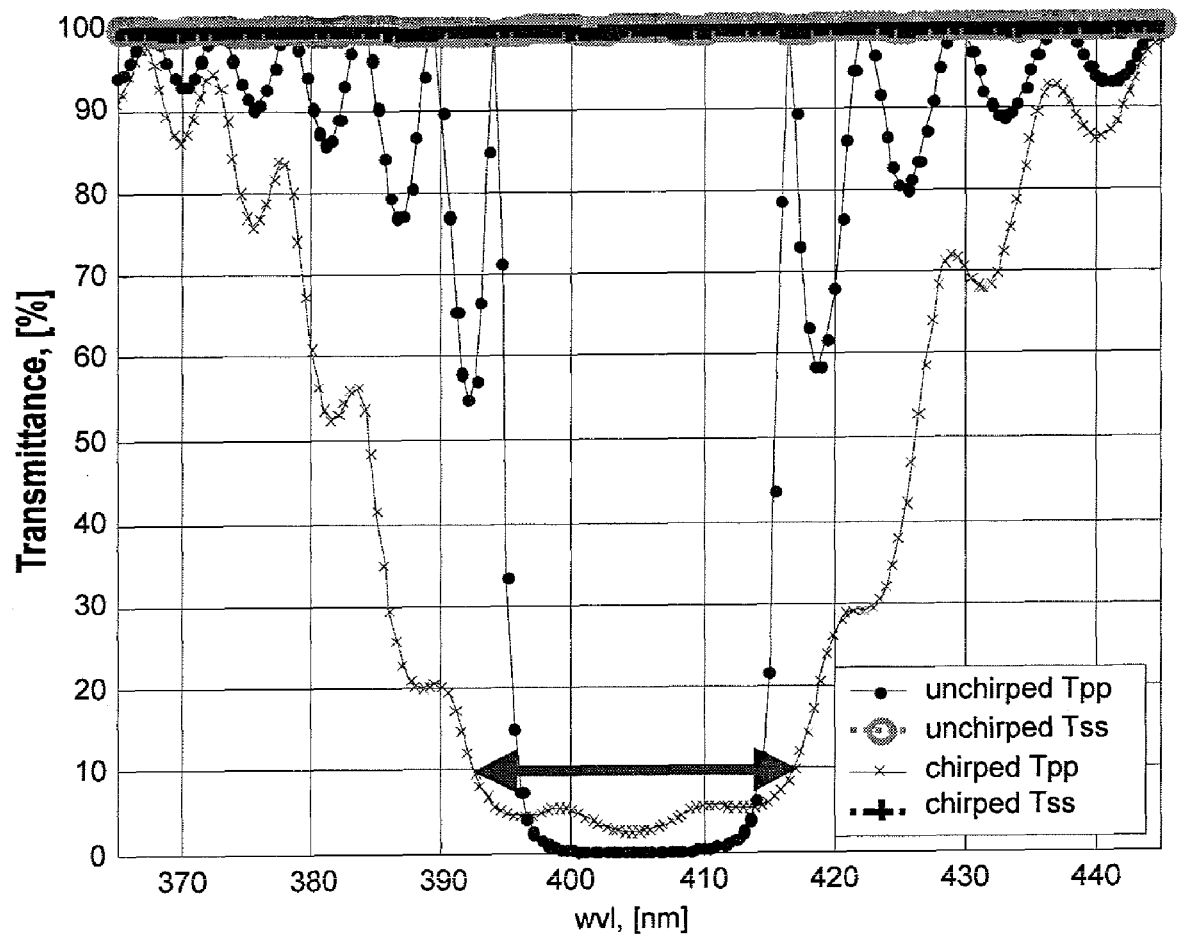
FIG. 12 shows the modeled transmission spectra of a blue-violet band reflective Cartesian polarizer for a normal incident cone illumination.

Referring to FIG. 12, there is shown the theoretical transmission spectra of two A/C-plate S-polarizers, centered at normal incidence over λ=405 nm band. The A/C-plate polarizers were modeled using 50 repeating A-plate/C-plate base units, as well as their associated alignment layers at 5 nm physical thickness. Full refractive index dispersion characteristics of the A-plate, C-plate and alignment layers were modeled. Each base/repeating unit includes positive uniaxial LCP materials of {1.61, 1.75} indices of refraction at λ=405 nm and photo-aligned polymer material of 1.69 refractive index at λ=405 nm.

In the unchirped example, the QWOT is fixed at 101.25 nm (i.e., ¼ of 405 nm), which corresponds to a nominal physical thickness of the A-plate, C-plate and LPP alignment layers being approximately 58 nm, 53 nm and 5 nm, respectively. In the chirped embodiment, the QWOT is varied ±6% from the central QW stack region, which has a 101.25 nm optical thickness. In both the chirped and unchirped examples, it is evident that a 10:1 polarization contrast ratio can be obtained with the GBO S-polarizer aligned at normal incidence. In the unchirped example the bandwidth is approximately 18 nm. In the chirped example, the bandwidth is approximately 24 nm. Advantageously, this polarization extinction is adequate for use as a laser diode protection filter in an OPU.

Notably, the A-plate and C-plate layer thicknesses are relatively small. Accordingly, spin-coating the birefringent materials in solution onto the substrate is expected to be advantageous. More specifically, using a spin-coating technique will allow the layers to be deposited with the required thickness and uniformity over a relatively large area. In contrast, conventional polymer co-extrusion processes may not be able to accurately provide these thin layers. While the A/C-plate S-polarizer has been modeled with 50 repeat units, more or fewer retarder pairs are also possible. Notably, a thinner stack design will have a less saturated reflection band, with little change to the transmission spectrum.

Figure 13:
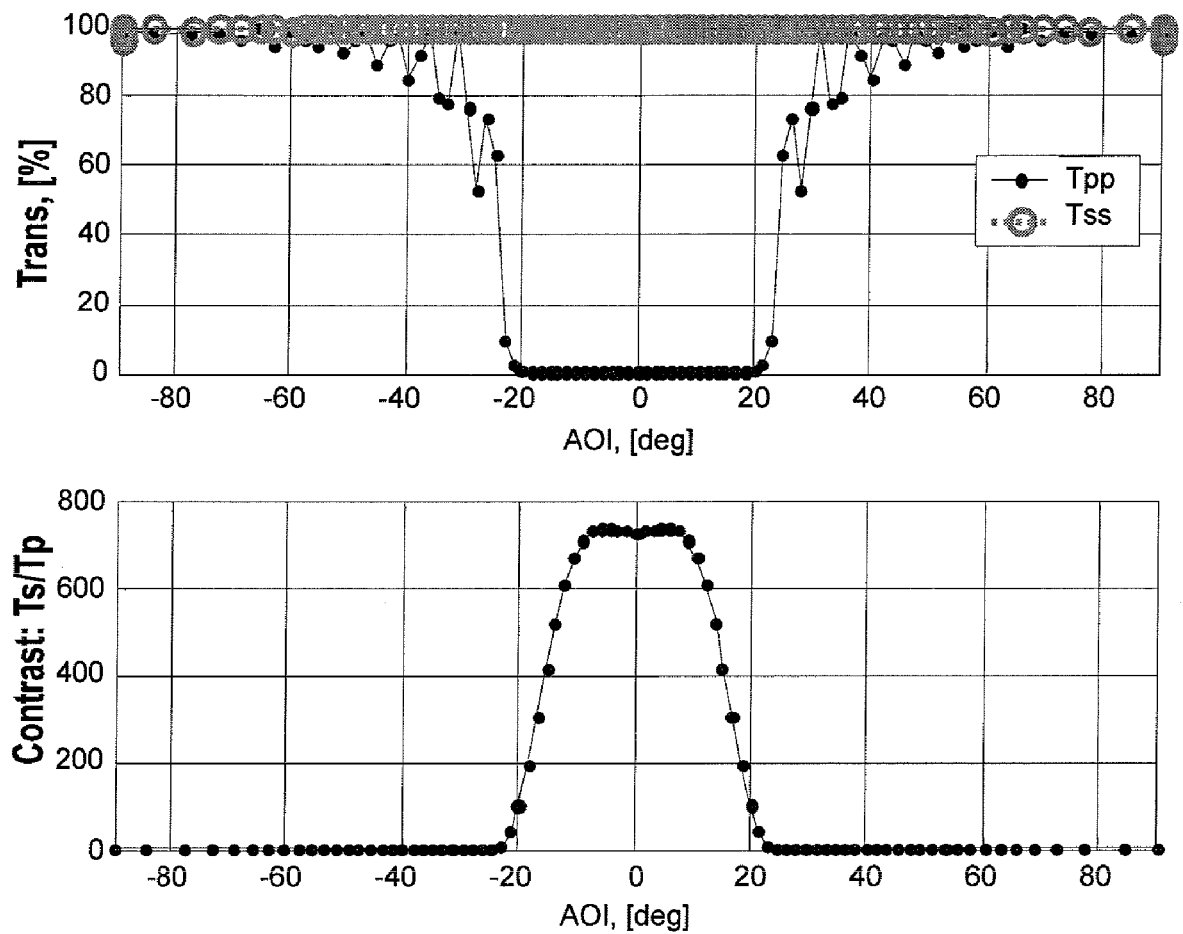
FIG. 13 shows the modeled S-polarization and P-polarization transmittance profiles vs. AOI (top plot) and the ratio of 'S' to 'P' transmittance (bottom plot)

As discussed above, GBO polarizers are known to be rather tolerant to a cone of incidence. Referring to FIG. 13, the angular response of the transmittance and the transmitted polarization contrast ratio at the center wavelength of λ=405 nm is shown. This chirped polarizer has over ±23° of angular bandwidth to maintain at least 10:1 contrast. In fact, a full spectrum of polarization contrast over the typically ±7° blue-violet laser diode divergence cone is almost identical to the normal incidence spectrum.

Other GBO structures such as an A/C-plate P-polarizer, O/O-plate S-polarizer, and an O/O-plate P-polarizer, which although not modelled here, can be designed in a similar manner. In each case, each configuration will require some optimization due to the available birefringent materials and processing constraints, such as optic axis alignment. It addition, each configuration may include a mixture of two different LCPs (e.g., one for the A-plate layer and one for the C-plate layer). Notably, selecting the material principal indices to be very similar allows the GBO polarizer to be designed and fabricated with adequate wavelength and angular bandwidths for use in OPU systems as laser protective filters.

In each of the embodiments illustrated and/or discussed with reference to FIGS. 5, 7, 9, and 10, the multi-layer stack includes a plurality of alternating birefringent layers. Alternatively, a GBO polarizer can be fabricated using a plurality of birefringent layers alternating with a plurality of isotropic layers.

Figure 14:
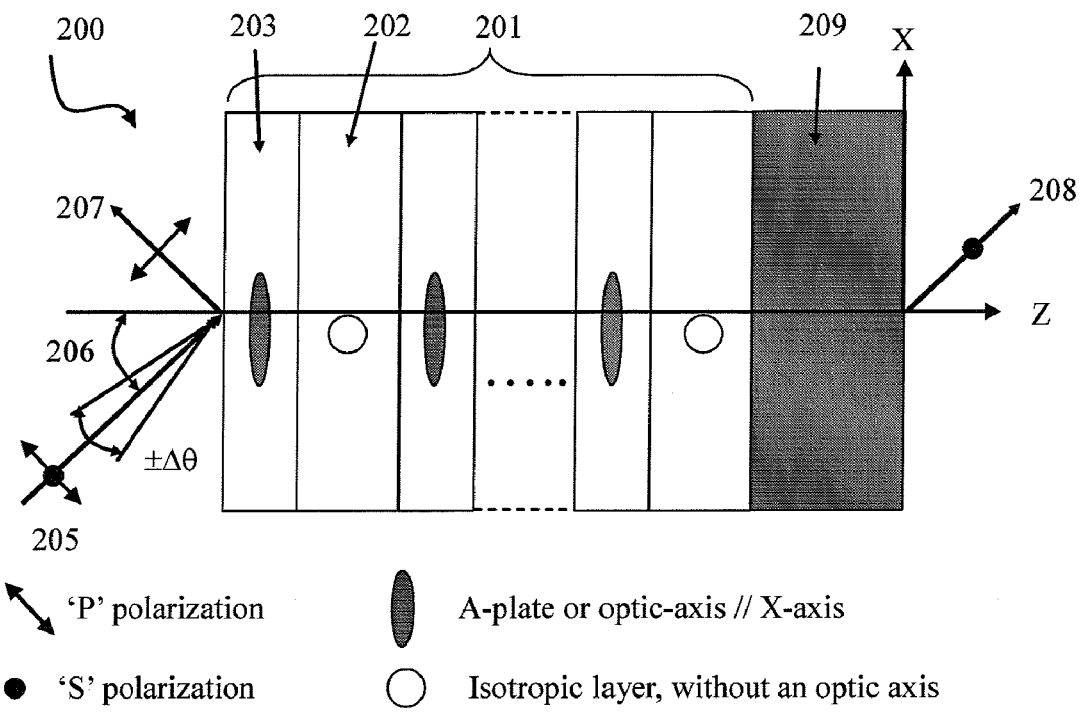
FIG. 14 is a schematic diagram of a multi-layer GBO S-polarizer in accordance with an embodiment of the instant invention, including a plurality of alternating A-plate/isotropic elements, where the A-plate elements have their slow axes oriented along X-axis.

Referring to FIG. 14, there is shown a reflective polarizer for use as a protection filter in an OPU in accordance with another embodiment of the instant invention, based on the GBO effect. The reflective polarizer 200, which has an alternating A-plate/isotropic material configuration, includes a stack of QW elements 201 disposed on a first surface of a transparent substrate 209. The QW stack 201 includes a first plurality of elements including a first birefringent material, alternating with a second plurality of elements formed from an isotropic material. Each element (e.g., 203) in the first plurality of elements has a first physical thickness $d_1$, a first birefringent index set of $\{n_{1o}, n_{1e}\}$, and is oriented as an A-plate retarder with its optic axis parallel to the X-axis. Each element (e.g., 202) in the second plurality of elements has a second physical thickness $d_2$ and a second birefringent index $n_2$. Each element in the first plurality elements is an optical retarder.

In operation, light 205 with a center wavelength and a bandwidth defined is incident on the reflective polarizer 200 along the XZ plane at an angle θ 206, with a half cone size of Δθ. With the orientations of the two constituent retarders shown in device 200, the S-polarization is predominantly transmitted 208 whereas the P-polarization is predominantly reflected 207. Accordingly, this reflective polarizer is referred to as an S-polarizer.

In this A-plate/isotropic alternating element design, the ordinary refractive index of the first birefringent material is approximately matched to refractive index of the isotropic material. This Z-index matched design has a unique property that the P-polarization reflectance is independent of the angle of incidence. The optical thicknesses of the first plurality of elements and the second plurality of elements corresponds to approximately quarter-wavelength at the nominal angle of incidence θ at the cone center and at the nominal center wavelength.

The base unit of the S-polarizer is configured as a half wavelength at the nominal angle of incidence θ at the cone center and at the nominal center wavelength. For a positive uniaxial material configured as A-plates in the first plurality of elements and the second plurality of isotropic layers (as shown in FIG. 14), the half-wave optical thickness (HWOT) is calculated using the ordinary and extraordinary indices of first birefringent material and the isotropic refractive index of the second material and the center wavelength $\lambda_0$, $$d_1 \frac{n_{1e}}{n_{1o}} \sqrt{(n_{1o})^2 - \sin^2(\theta)} + d_2 \sqrt{(n_2)^2 - \sin^2(\theta)} = \lambda_0/2, \qquad (10)$$

where $n_{1o}=n_2$ and $n_{1e}>n_{1o}$. Similarly, for a negative uniaxial configured as A-plates in the first plurality of layers (disc-like index indicatrix, not shown here) and the second plurality of isotropic layers, the HWOT is calculated using ordinary and extraordinary indices of the first birefringent material and the isotropic refractive index of the second material and as Eq. (10), however, these are related by $n_{1o}=n_2$ and $n_{1e}<n_{1o}$.

In general, any uniaxial and/or biaxial birefringent layer can be used as the first birefringent material with any second isotropic layer. Optionally, the second plurality of isotropic layers serves as the alignment layers for the first plurality of birefringent layers. Optionally, the center wavelength of successive repeat units is varied across the thickness of the polarizer (e.g., the HWOT is chirped such that the center wavelength of the repeat unit closer to the entrance to the film is shorter and the center wavelength of the repeat unit closer to the substrate is longer, and vice versa). A typical chirp fraction is less than ±10% for the outermost repeat units when compared to the central repeat unit.

Figure 15:
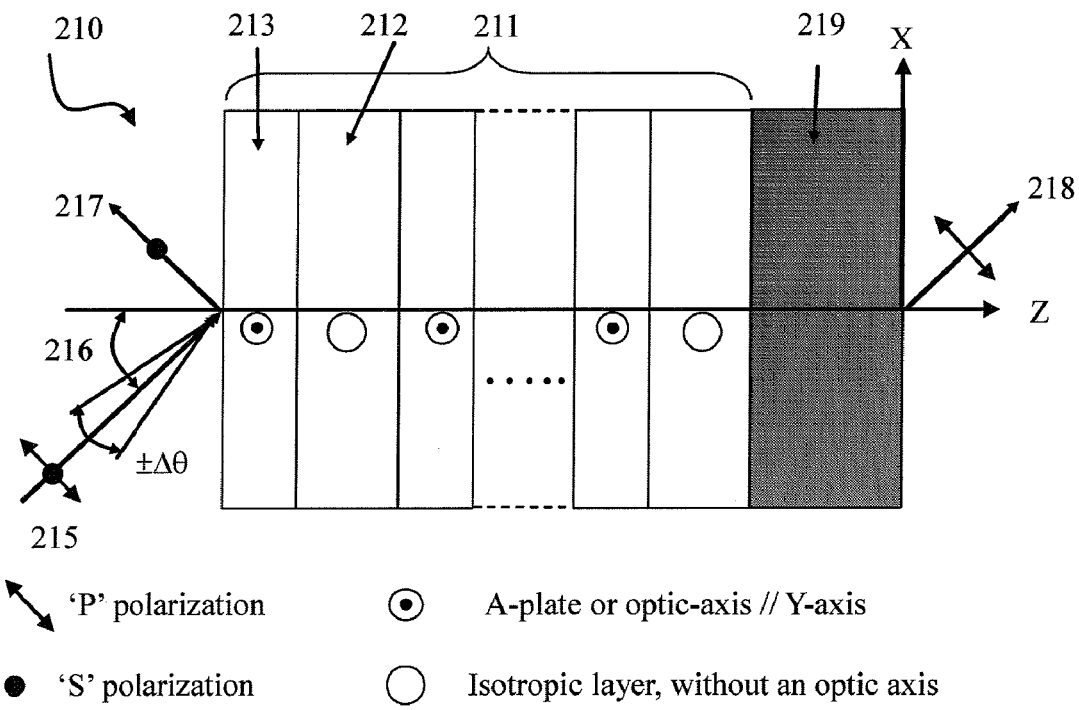
FIG. 15 is a schematic diagram of a multi-layer GBO P-polarizer in accordance with an embodiment of the instant invention, including a plurality of alternating A-plate/isotropic elements, where the A-plate elements have their slow axes oriented along Y-axis.

Referring to FIG. 15, there is shown a reflective polarizer for use as a protection filter in an OPU in accordance with another embodiment of the instant invention, based on the GBO effect. The reflective polarizer 210, which has an alternating A-plate/isotropic material configuration, includes a stack of QW elements 211 disposed on a first surface of a transparent substrate 219. The QW stack 211 includes a first plurality of elements including a first birefringent material, alternating with a second plurality of elements formed from an isotropic material. Each element (e.g., 213) in the first plurality of elements has a first physical thickness $d_1$, a first birefringent index set of $\{n_{1o}, n_{1e}\}$, and is oriented as an A-plate retarder with its optic axis parallel to the Y-axis. Each element (e.g., 212) in the second plurality of elements has a second physical thickness $d_2$ and a second birefringent index $n_2$. Each element in the first plurality elements is an optical retarder.

In operation, light 215 with a center wavelength and a bandwidth defined is incident on the reflective polarizer 210 along the XZ plane at an angle θ 216, with a half cone size of Δθ. With the orientations of the two constituent retarders shown in device 210, the P-polarization is predominantly transmitted 218 whereas the S-polarization is predominantly reflected 217. Accordingly, this reflective polarizer is referred to as a P-polarizer.

In this A-plate/isotropic alternating element design, the ordinary refractive index of the first birefringent material is approximately matched to refractive index of the isotropic material. This Z-index matched design has a unique property that the P-polarization reflectance is independent of the angle of incidence. The optical thicknesses of the first plurality of elements and the second plurality of element correspond to approximately quarter-wavelength at the nominal angle of incidence θ at the cone center and at the nominal center wavelength.

The base unit of the S-polarizer is configured as a half of wavelength at the nominal angle of incidence θ at the cone center and at the nominal center wavelength. For a positive uniaxial material configured as A-plates in the first plurality of elements and the second plurality of isotropic layers (as shown in FIG. 15), the half-wave optical thickness (HWOT) is calculated using the ordinary and extraordinary indices of the first birefringent material and the refractive index of the second isotropic material and the center wavelength $\lambda_0$, $$d_1\sqrt{(n_{1e})^2-\sin^2(\theta)}+d_2\sqrt{(n_2)^2-\sin^2(\theta)}=\lambda_0/2, \quad (11)$$

where $n_{1o}=n_2$ and $n_{1e}>n_{1o}$. Similarly, for a negative uniaxial configured as A-plates in the first plurality of layers (disc-like index indicatrix, not shown here) and the second plurality of isotropic layers, the HWOT is calculated using ordinary and extraordinary indices of the first birefringent material and the isotropic refractive index of the second material and as Eq. (11), however, these are related by $n_{1o}=n_2$ and $n_{1e}<n_{1o}$.

In the case of a P-polarizer, the S-polarization is always tangential to the layer interfaces. Hence, the phase thickness of each layer utilizes an expression similar to an isotropic layer. In general, any uniaxial and/or biaxial birefringent layer can be used as the first birefringent material with any second isotropic layer. Optionally, the second plurality of isotropic layers serves as the alignment layers for the first plurality of birefringent layers. Optionally, the center wavelength of successive repeat units is varied across the thickness of the polarizer (e.g., the HWOT is chirped such that the center wavelength of the repeat unit closer to the entrance to the film is shorter and the center wavelength of the repeat unit closer to the substrate is longer, and vice versa). A typical chirp fraction is less than ±10% for the outermost repeat units when compared to the central repeat unit.

Figure 16:
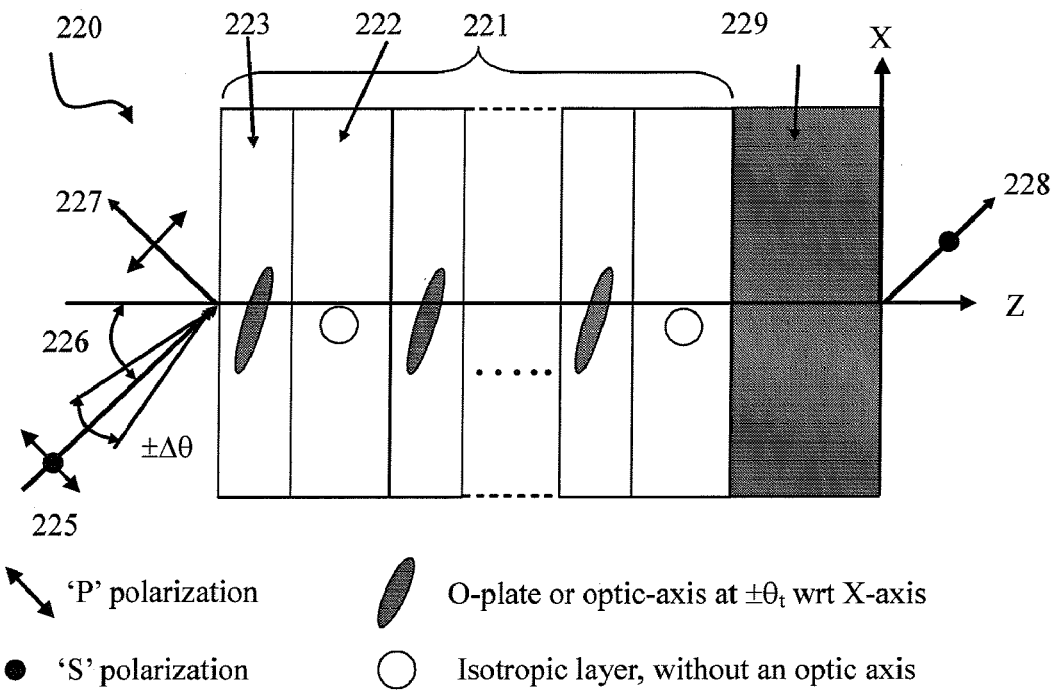
FIG. 16 is a schematic diagram of a multi-layer GBO S-polarizer in accordance with an embodiment of the instant invention, including a plurality of alternating O-plate/isotropic elements, where the O-plates have their slow axes oriented in the p-plane.

Referring to FIG. 16, there is shown a reflective polarizer for use as a protection filter in an OPU in accordance with another embodiment of the instant invention, based on the GBO effect. The reflective polarizer 220, which has an alternating small angle tilt O-plate/isotropic configuration, includes a stack of QW elements 221 disposed on a first surface of a transparent substrate 229. The QW stack 221 includes a first plurality of elements including a first birefringent material alternating with a second plurality of elements formed from an isotropic material. Each element (e.g., 223) in the first plurality of elements has a first physical thickness $d_1$, a first birefringent index set of $\{n_{1o}, n_{1e}\}$, and is oriented as an O-plate retarder with its optic axis forming an acute angle with the plane of the substrate by less than 45 degrees, and with its optic axis being parallel to the XZ coordinate plane. Each element (e.g., 222) in the second plurality of elements has a second physical thickness $d_2$ and a birefringent index $n_2$. Each element in the first plurality elements is an optical retarder. The optical thickness of each element in the first and second plurality of elements corresponds to approximately a QW at the nominal angle of incidence θ at the cone center and at the nominal center wavelength.

In operation, light 225 with a center wavelength and a bandwidth defined is incident on the reflective polarizer 220 along the XZ plane at an angle θ 226, with a half cone size of Δθ. With the orientations of the two constituent retarders shown in device 220, the S-polarization is predominantly transmitted 228 whereas the P-polarization is predominantly reflected 227. Accordingly, this reflective polarizer is referred to as a S-polarizer.

The deviation of the optical axis for the first plurality of retarder elements from the plane of the substrate is less than 45 degrees, more preferably less than 15 degrees, and still more preferably less than 5 degrees. In general, the deviation in the optic axis alignment is an artifact of the photo-aligned, photo-cured manufacturing process and is a parameter of the birefringent and photo-alignment materials used. While the effective indices of the birefringent elements with tilted optic axes along the system XYZ coordinates for a off-normal incidence light is more involved, it can be suitably evaluated with a 4×4 matrix based calculation algorithm, as shown in Eqs. 6a-6c. At normal incidence, the HWOT is obtained when, $$d_1n_{1x}+d_2n_2=\lambda_0/2, \quad (12)$$

and the indices along the S-plane are nearly matched, i.e., $n_2 \approx n_{1y}$.

Optionally, the second plurality of isotropic layers serves as the alignment layers for the first plurality of birefringent layers. Optionally, the center wavelength of successive repeat units is varied across the thickness of the polarizer (e.g., the HWOT is chirped such that the center wavelength of the repeat unit closer to the entrance to the film is shorter and the center wavelength of the repeat unit closer to the substrate is longer, and vice versa). A typical chirp fraction is less than ±10% for the outermost repeat units when compared to the central repeat unit.

Figure 17:
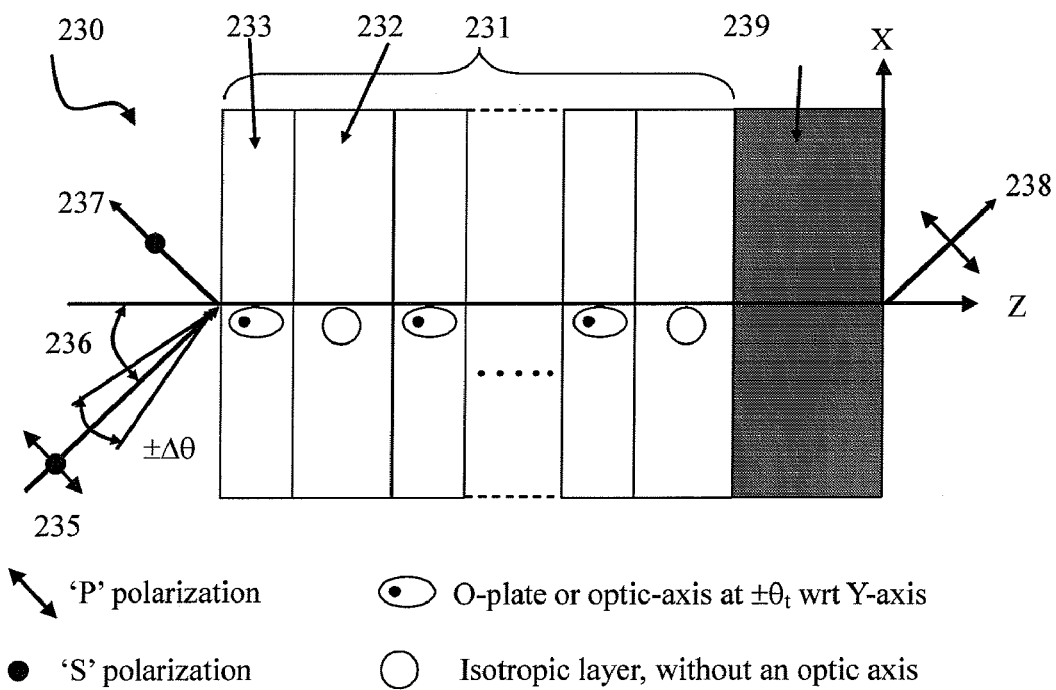
FIG. 17 is a schematic diagram of a multi-layer GBO P-polarizer in accordance with an embodiment of the instant invention, including a plurality of alternating O-plate/isotropic elements, where the O-plates have their slow axes oriented in the YZ-plane.

Referring to FIG. 17, there is shown a reflective polarizer for use as a protection filter in an OPU in accordance with another embodiment of the instant invention, based on the GBO effect. The reflective polarizer 230, which has an alternating small angle tilt O-plate/isotropic configuration, includes a stack of QW elements 231 disposed on a first surface of a transparent substrate 239. The QW stack 231 includes a first plurality of elements formed from a first birefringent material alternating with a second plurality of elements formed from an isotropic material. Each element (e.g., 233) in the first plurality of elements has a first physical thickness $d_1$, a first birefringent index set of $\{n_{1o}, n_{1e}\}$, and is oriented as an O-plate retarder with the optic axis forming an acute angle with the plate of the substrate by less than 45 degrees and its optic axis parallel to the YZ coordinate plane. Each element (e.g., 232) in the second plurality of elements has a second physical thickness $d_2$ and a birefringent index $n_2$. Each element in the first plurality of elements is an optical retarder.

In operation, light 235 with a center wavelength and a bandwidth defined is incident on the reflective polarizer 230 along the XZ plane at an angle θ 236, with a half cone size of Δθ. With the orientations of the two constituent retarders shown in device 230, the P-polarization is predominantly transmitted 238 whereas the S-polarization is predominantly reflected 137. Accordingly, this reflective polarizer is referred to as a P-polarizer.

The deviation of the optical axis for the first plurality of retarder elements from the plane of substrate is less than 45 degrees, more preferably less than 15 degrees, and still more preferably less than 5 degrees. This deviation in the optic axis alignment is an artifact of the photo-aligned, photo-cured manufacturing process and is a parameter of the birefringent and photo-alignment materials used. While the effective indices of these birefringent layers with tilted optic axes along the system XYZ coordinates for a off-normal incidence light is more involved and can be suitably evaluated with a 4×4 matrix based calculation algorithm, the indices for normal incident light can be stated as Eqs. 7a-c. At normal incidence, the HWOT is obtained when, $$d_1 n_{1y} + d_2 n_2 = \lambda_0/2, \tag{13}$$

and when the indices along the P-plane are nearly matched, i.e., $n_2 \approx n_{1x}$.

In each of the embodiments illustrated and/or discussed with reference to FIGS. 14, 15, 16, and 17, the effective extraordinary-wave index of refraction in the first plurality of birefringent layers is mismatched from the effective index of refraction in the second plurality of isotropic layers such that a high reflection for a first linear polarization aligned parallel to the extraordinary-wave direction is obtained. Similarly, the effective ordinary-wave index of refraction in the first plurality of birefringent layers is approximately matched from the effective index of refraction in the second plurality of isotropic layers such that a high transmission for a second linear polarization aligned parallel to the ordinary-wave direction is obtained. Alternatively, the effective ordinary-wave index of refraction in the first plurality of birefringent layers is mismatched from the effective index of refraction in the second plurality of isotropic layers such that a high reflection for a first linear polarization aligned parallel to the ordinary-wave direction is obtained. Similarly, the effective extraordinary-wave index of refraction in the first plurality of birefringent layers is approximately matched from the effective index of refraction in the second plurality of isotropic layers such that a high transmission for a second linear polarization aligned parallel to the ordinary-wave direction is obtained.

In each of the embodiments illustrated and/or discussed with reference to FIGS. 14, 15, 16, and 17, each A-plate and O-plate retarder requires a dedicated alignment layer, which is omitted from the figures for illustrative purposes. The photo-chemistry for each alignment layer is the same or different for different layer materials/orientations.

Figure 18:
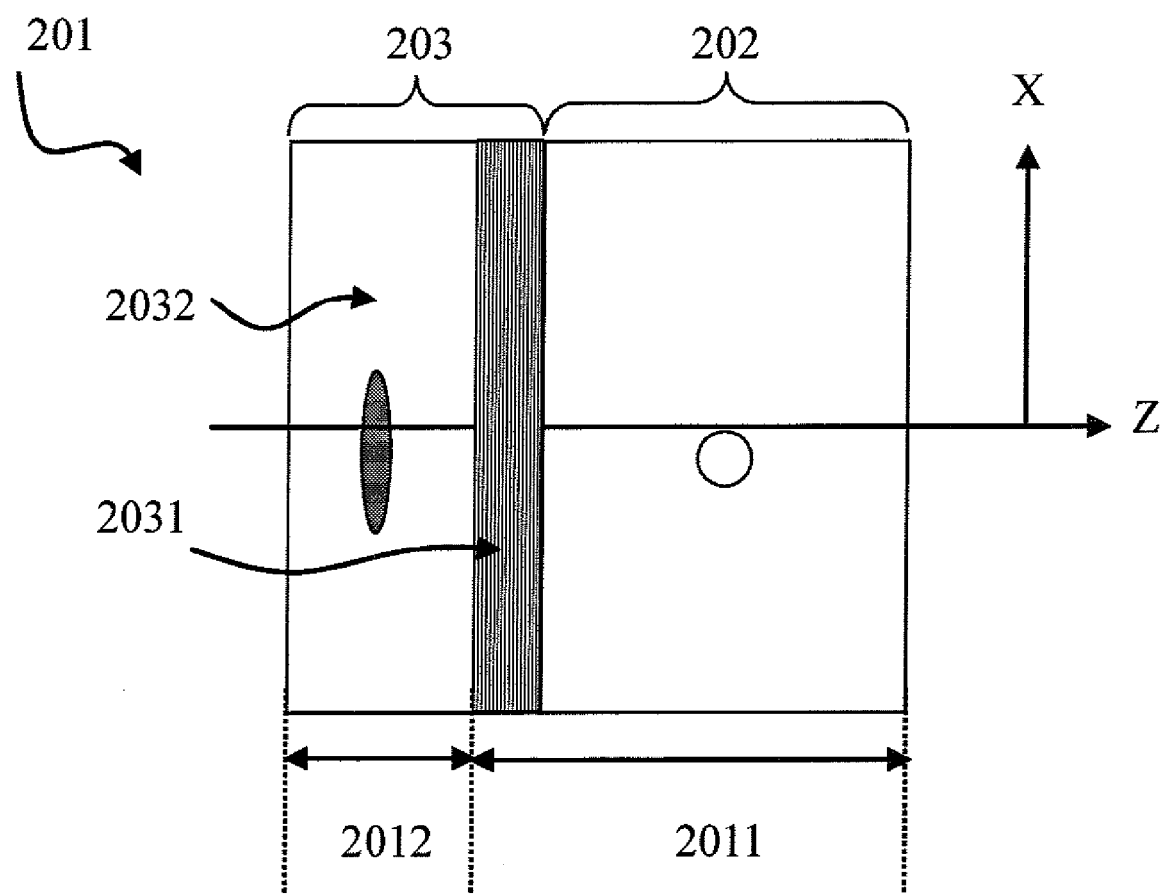
FIG. 18 is a schematic diagram of the base unit of the S-polarizer illustrated in FIG. 14, showing the alignment layers.
Figure 18:
Figure 18:

Referring to FIG. 18, a schematic diagram of the base unit of the S-polarizer 200 illustrated in FIG. 14 including the alignment layers is shown. The base unit 201 includes the first A-plate optical retarder element 203 and the second isotropic element 202. The A-plate retarder element 203 includes a birefringent layer 2032, which has a first physical thickness $d_1$, a first birefringent index set of $\{n_{1o}, n_{1e}\}$, and is oriented as an A-plate retarder with the optic axis parallel to the X-axis, and a non-birefringent (or very weakly birefringent) layer 2031, which has a third layer thickness $d_3$ and a third isotropic index of refraction $n_3$. This layer 2031 is used to orient (align) the A-plate layer 2032 upon photo-exposure. The isotropic second element 202 is formed from an isotropic material having a second physical thickness $d_2$ and a second refractive index $n_2$.

The base unit 201 is configured to have halfwave optical thickness (HWOT) at the nominal angle of incidence θ at the cone center and at the nominal center wavelength. More specifically, the optical thicknesses of layers 2032, 2031, and 202 sum to a HWOT at the nominal angle of incidence θ at the cone center and at the nominal center wavelength, according to:

$$d_1 \frac{n_{1e}}{n_{1o}} \sqrt{(n_{1o})^2 - \sin^2(\theta)} + d_2 \sqrt{(n_2)^2 - \sin^2(\theta)} + d_3 \sqrt{(n_3)^2 - \sin^2(\theta)} = \lambda_0/2, \tag{14}$$

where θ is the angle of incidence in air. For incidence in immersed medium of refractive index $n_a$, $\sin(\theta)$ is replaced by $n_a \sin(\theta)$.

In the embodiment described with reference to FIG. 18, the A-plate element 203 includes the alignment layer 2031. According to another embodiment, the isotropic element 202 provides the means to align the A-plate element 203 (i.e., the A-plate element 203 does not need to include alignment layer 2031). In fact, in practice it is more likely that the second plurality of isotropic elements serves as the alignment materials for the first plurality of birefringent layers. These isotropic alignment layers are typically of the order of tens of nanometer for a polarizer designed at λ=405 nm center wavelength.

Base units similar to that illustrated in FIG. 18 and/or as described above, can also designed for the polarizers described with reference to FIGS. 15, 16, and 17, with the understanding that the configuration of the birefringent layers can be a combination of A-plate and/or O-plates. For example, the A-plate layer can be an O-plate with a small out-of-plane tilt, such that the in-plane retardation component of the layer is larger than its out-of-plane retardation component.

As a calculation example of a GBO reflective S-polarizer comprising of alternating A-plate/isotropic layers, a repeated QW stack of the commercially available LCP A-plate layers having indices $\{n_{1o}, n_{1e}\}$ of $\{1.61, 1.75\}$ at λ=405 nm alternating with a commercially available photo-alignment layer material, having $n_2$=1.69 at λ=405 nm, was modeled. As can be anticipated, both X-polarized and Y-polarized linear polarization will be reflected because the isotropic layer index lies between the ordinary and extraordinary indices of the A-plate material.

Figure 19:
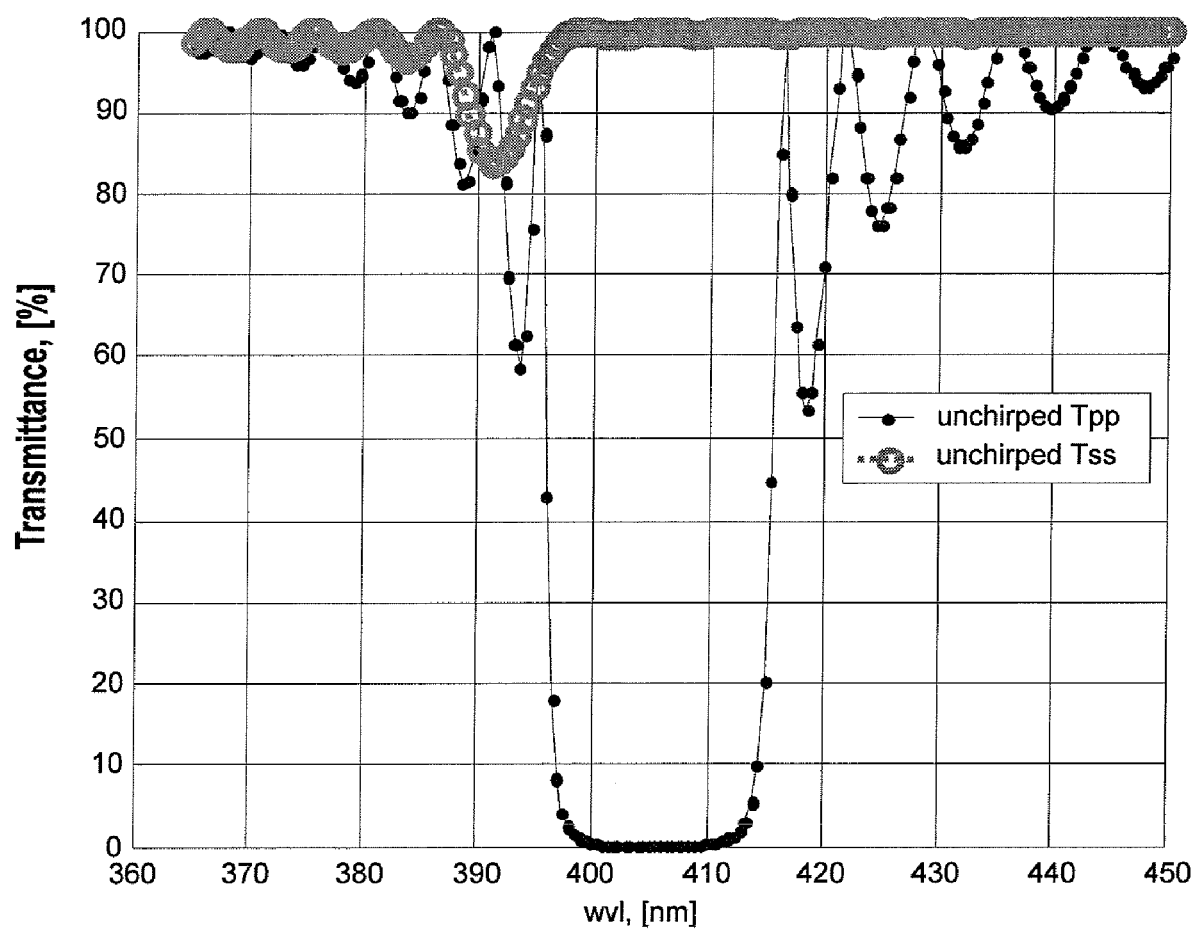
FIG. 19 shows the modeled reflection spectra of a blue-violet band alternating A-plate/isotropic layer reflective polarizer for a normal incident cone illumination.

FIG. 19 illustrates the theoretical spectra, if the nominal alignment layer index was matched to the ordinary index of the A-plate layer. More specifically, FIG. 19 shows the transmission spectra for Tpp (P-polarization input and P-polarization transmitted output) and Tss (S-polarization input and S-polarization transmitted output). Although the indices for the two repeated layers are matched along the S-plane at λ=405 nm, the dispersion differences result in a small reflection band for the S-polarization near the band edge. The in-band S-polarization transmission will have ripples in this case.

In the embodiments described above, it has been assumed that each of the ChLC reflective polarizers and the GBO alternating layer reflective polarizers functions as an optical element with low loss in the required polarization plane. Accordingly, it is preferred that the external surfaces of these multi-layer film polarizers be coated with an anti-reflection (AR) stack. As is common in many integration examples of spin-coated polymer layers and vacuum chamber coated dielectric AR layers, one can choose between a single or a dual substrate approach.

Figure 20:
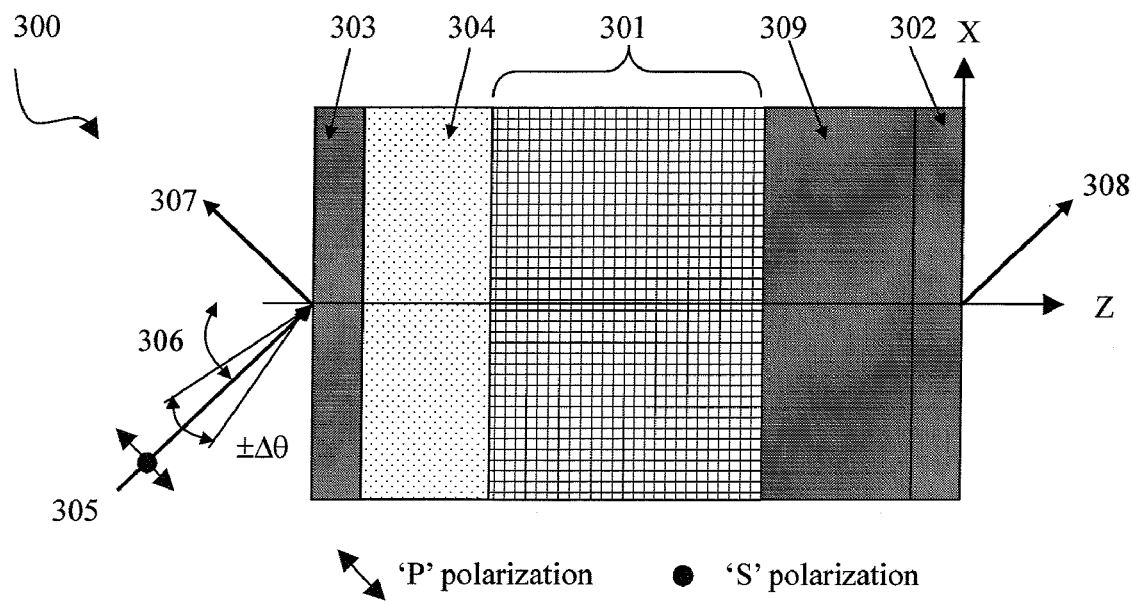
FIG. 20 shows a schematic diagram of a linear Cartesian polarizer with external AR coatings on the substrate and the multi-layer polarizing stack, in accordance with one embodiment of the instant invention.

Referring to FIG. 20, there is shown a schematic diagram of an AR-coated Cartesian reflective polarizer in accordance with one embodiment of the instant invention. The Cartesian polarizer 300 includes a multi-layer polarizing stack 301, a first AR multi-layer stack 302, a second AR multi-layer stack 303, and a protective optical hard coat, such as lacquer 304, all of which are all supported by a single transparent substrate 309. More specifically, the multi-layer polarizing stack 301 is disposed on a first surface of the transparent substrate 309, while the first AR multi-layer stack 302 is disposed on the second opposite surface of the transparent substrate 309. The protective optical hard coat 304 is disposed between the multi-layer polarizing stack 301 and the second AR multi-layer stack 303.

The multi-layer polarizing stack 301 includes a photo-aligned liquid crystal based Cartesian polarizing stack, which for example, may include a QWP/ChLC/QWP stack, an alternating QW retarder/QW retarder stack, or an alternating QW retarder/QW isotropic layer stack. Some examples of suitable photo-aligned liquid crystal based polarizing stacks are illustrated in FIGS. 2, 5, 7, 9, 10, 14, 15, 16, and 17.

When this Cartesian polarizer is utilized to cause preferential transmission and reflecting with little internal loss (i.e., diattenuation function), the incident light 305 with a center wavelength and a bandwidth defined is impinged on the Cartesian polarizer along the XZ plane at an angle of incidence 306 θ, with a half cone size of Δθ. Depending on the configuration of the multi-layer polarizing stack, either S-polarization or P-polarization within the defined bandwidth is predominantly transmitted 308 whereas the orthogonal of the predominant transmitted polarization is predominantly reflected 307.

Figure 21:
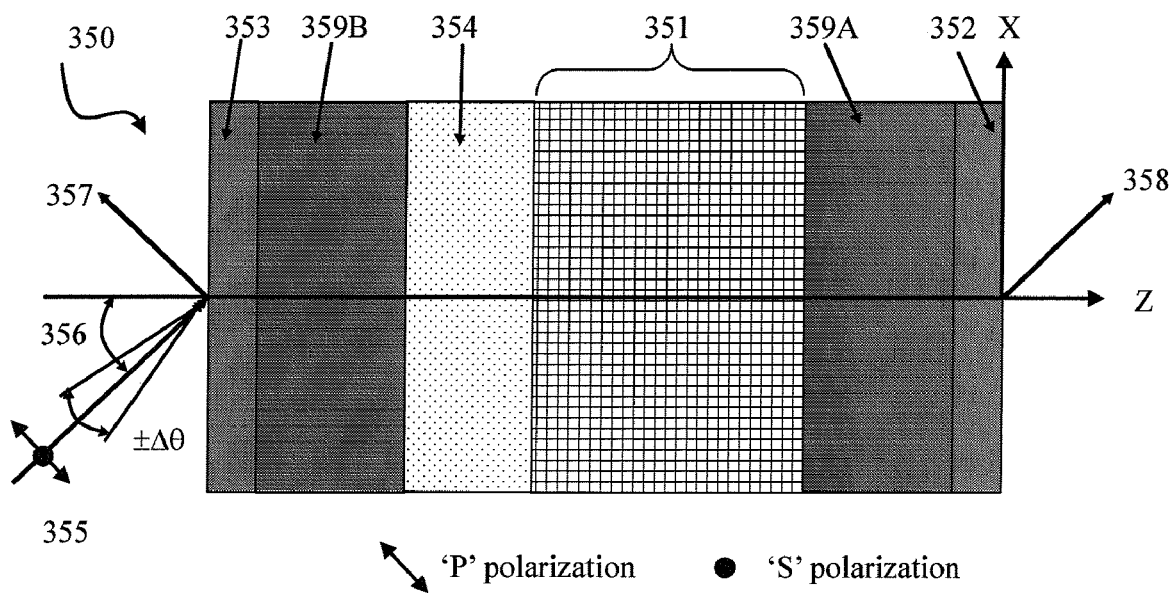
FIG. 21 shows a schematic diagram of a linear Cartesian polarizer with external AR coatings on two substrates, in accordance with one embodiment of the instant invention.

Referring to FIG. 21, there is shown a schematic diagram of an AR-coated Cartesian reflective polarizer in accordance with another embodiment of the instant invention. The Cartesian polarizer 350 includes a first transparent substrate 359A having a multi-layer polarizing stack 351 disposed on a first surface thereof and a first AR multi-layer stack 352 disposed on a second opposite surface thereof. The first transparent substrate 359A is laminated to a first surface of a second transparent substrate 359B via an optical adhesive layer 354. A second AR multi-layer stack 353 is disposed on a second opposite surface of the second transparent substrate 359B.

The multi-layer polarizing stack 351 includes a photo-aligned liquid crystal based Cartesian polarizing stack, which for example, may include a QWP/ChLC/QWP stack, an alternating QW retarder/QW retarder stack, or an alternating QW retarder/QW isotropic layer stack. Some examples of suitable photo-aligned liquid crystal based polarizing stacks are illustrated in FIGS. 2, 5, 7, 9, 10, 14, 15, 16, and 17.

When this Cartesian polarizer is utilized to cause a preferential transmission and reflection with little internal loss (i.e., diattenuation function), the incident light 355, with a center wavelength and a bandwidth defined is impinged on the Cartesian polarizer along the XZ plane at an angle of incidence 356 θ, with a half cone size of Δθ. Depending on the configuration of the multi-layer polarizing stack, either S-polarization or P-polarization within the defined bandwidth is predominantly transmitted 358 whereas the orthogonal of the predominant transmitted polarization is predominantly reflected 357.

In each of the above embodiments described with reference to FIGS. 2, 5, 7, 9, 10, 14, 15, 16, 17, 20, and 21, the photo-aligned Cartesian polarizer includes at least three birefringent elements, each including an alignment/orientation layer and a liquid crystal polymer layer. In general, the alignment layer, which as described above is often referred to as a linear photo-polymerizable (LPP) film or a photo-orientable polymer network (PPN), is applied as a solution of linear photo-polymer, is structured/aligned with polarized UV light, and is stabilized with a first cross-linking step in unpolarized light. Once the alignment layer is fixed, a solution of liquid crystal polymer material is applied (e.g., spin-coated) over the LPP layer. As is well known in the art, the LCP solution typically includes cross-linkable liquid crystalline monomers, oligomers, and/or polymers precursors having cross-linkable groups. Optionally, the LCP layer includes a chiral dopant. Once the LCP layer is applied with the orientation of the LPP film, the LCP layer is then exposed to unpolarized UV light for a second cross-linking step. The result is a cross-linked, optically structured liquid crystal polymer with a pre-established orientation pattern. Photochemical cross-linking of the alignment layer polymer and the subsequent cross-linking of the LCP molecules is expected to improve the reliability of the polarizer under high power illumination and short wavelength laser exposure (e.g., 405 nm).

In each of the above embodiments described with reference to FIGS. 2, 5, 7, 9, 10, 14, 15, 16, 17, 20, and 21, the photo-aligned Cartesian polarizer is shown/discussed as an air-incidence polarizer. Alternatively, the photo-aligned Cartesian polarizer in accordance with the instant invention has an immersed polarizer configuration. In particular, the multi-layer stacks may be immersed in prisms and/or wedge shaped substrates. In these embodiments, the photo-aligned Cartesian polarizer may be used as a polarization beam splitter or combiner. Advantageously, the additional optical path length from the immersed media will help simply the design. Notably, these photo-aligned, photo-cured Cartesian polarizers may be used a normal incidence, or at an angle, with a collimated beam, or with a cone of light.

In each of the above embodiments described with reference to FIGS. 2, 5, 7, 9, 10, 14, 15, 16, 17, 20, and 21, the Cartesian polarizer has been discussed/modeled over a wavelength band centered at λ=405 nm. While the use of the photo-aligned LCP-based Cartesian polarizers is advantageous in the high power, relatively short wavelength environment of the blue/violet band in OPUs, they are also expected to be useful at other wavelengths and/or for other applications. In fact, the modest polarization contrast ratio of 10:1 quoted for the OPU protective filter is used as an example rather than as a limitation of the capability of the photo-aligned, photo-cured Cartesian polarizer fabrication techniques.

Of course, the above embodiments have been provided as examples only. It will be appreciated by those of ordinary skill in the art that various modifications, alternate configurations, and/or equivalents will be employed without departing from the spirit and scope of the invention. For example, the use of a continuously splayed LCP O-plate, rather than a uniformly tilted O-plate retarder layer in the photo-aligned GBO polarizers is envisioned. In addition, the A-plate retarders configured as QWP and QW layer in the Cholesteric and GBO polarizers, respectively, will likely be fabricated with a very small tilt angle. With regard to the photo-aligned ChLC polarizer, multiple-layer achromatic QWPs on both sides of the ChLC layer may be used to enhance the performance of linear to circular polarization conversion and vice versa. In addition, in what has been referred to as the ChLC polarizer, the photo-aligned, photo-cured process technology may instead utilize any chiral liquid crystal mixture. For example, if a chiral nematic LC is used to provide the cholesteric film, the optic axis of the individual LC molecules will be aligned parallel to the plane of the substrate but with a twist through the thickness of the chiral LC film such that the helical axis is aligned normal to the substrate. In general, this requires additional chiral agent doping of an ordinary nematic LC mixture. A ferroelectric LC, on the other hand, has a natural twist due to the energy minimization of a series of spontaneous polarization vectors found in the ferroelectric LC mixture. In this case, the helical axis is still aligned normal to the substrate, but the optical axis of individual LC molecule is not typically oriented in the plane of the substrate. The optic axis of the ferroelectric LC is inclined at a half-cone angle, typically between 10° and 45° vs. the helical axis. The precession of the optic axis through all azimuthal angles, along the thickness direction of the film, ensures that a Bragg reflection takes place for a suitable wavelength range. Due to the out-of-plane tilt of the ferroelectric LC, a smaller effective in-plane birefringence is realized. Consequently, the reflection bandwidth of the ferroelectric LC, configured as a helical twist state, is less than a cholesteric LC for the same intrinsic material birefringence. Accordingly, the scope of the invention is therefore intended to be limited solely by the scope of the appended claims.

The invention claimed is:

1. A method of fabricating a Cartesian polarizer comprising the steps of:
    providing at least three birefringent elements layered on a transparent substrate, each birefringent element including:
        a polymeric photo-aligned alignment layer; and
        a cross-linked liquid crystal polymer layer,
    wherein the optical thickness of each of the three birefringent elements is selected such that the Cartesian polarizer transmits light at a predetermined wavelength having a first polarization, and reflects light at the predetermined wavelength having a second orthogonal polarization, the light transmitted at the predetermined wavelength emitted from a laser diode in an optical pick-up unit, and
    wherein the Cartesian polarizer is a giant-birefringence optics polarizer.

2. A method according to claim 1, wherein the step of providing each of the at least three birefringent elements includes:
    applying a solution of a linear photopolymer on a surface to provide a polymeric alignment layer;
    irradiating the polymeric alignment layer with polarized UV radiation to induce a predetermined structure and form the polymeric photo-aligned alignment layer;
    applying a first solution of liquid crystal polymer precursor to the polymeric photo- aligned alignment layer to form a liquid crystal polymer layer, and
    irradiating the liquid crystal polymer precursor layer with UV light to provide the cross-linked liquid crystal polymer layer.

3. A method according to claim 1, wherein the at least three birefringent elements include a first plurality of A-plate elements alternating with a second plurality of C- plate elements, and wherein adjacent elements in the first and second plurality of elements have a combined optical thickness substantially equal to a half-wave at the predetermined wavelength.

4. A method according to claim 1, wherein the at least three birefringent elements include a first plurality of O-plate elements alternating with a second plurality of O- plate elements, and wherein adjacent elements in the first and second plurality of O-plate elements have a combined optical thickness substantially equal to a half-wave at the predetermined wavelength.

5. A method according to claim 4, wherein the first and second plurality of O-plate elements have their optic axes in the same plane, and wherein the optic axes of the first plurality of O-plate elements has a tilt angle that is smaller than the tilt angle of the optic axes of the second plurality of O-plate elements.

6. A method according to claim 4, wherein the first and second plurality of O-plate elements have their optic axes in orthogonal planes.

7. A method according to claim 4, wherein the at least three birefringent elements include a first plurality of A-plate elements, wherein the first plurality of A-plate elements alternates with a second plurality of substantially isotropic elements, and wherein adjacent elements in the first and second plurality of elements have a combined optical thickness substantially equal to a half-wave at the predetermined wavelength.

8. A method according to claim 1, wherein the at least three birefringent elements include a first plurality of O-plate elements, wherein the first plurality of O-plate elements alternates with a second plurality of substantially isotropic elements, and wherein adjacent elements in the first and second plurality of elements have a combined optical thickness substantially equal to a half-wave at the predetermined wavelength.

9. A method according to claim 1, wherein each polymeric photo-aligned alignment layer and each cross-linked liquid crystal polymer layer has an optical thickness substantially equal to one quarter-wave at the predetermined wavelength such that the at least three birefringent elements provide a quarter-wave stack of alternating layers.

10. A method according to claim 9, wherein each cross-linked liquid crystal polymer layer is one of an A-plate and an O-plate.

11. A method according to claim 10, wherein each polymeric photo-aligned alignment layer is substantially isotropic.

12. A method according to claim 1, including a first anti-reflection coating deposited on a second surface of the transparent substrate.

13. A method according to claim 12, including a second anti-reflection coating deposited on surface of the at least three birefringent elements.

14. A method according to claim 12, including a second transparent substrate, the second transparent substrate having a first side laminated to the at least three birefringent elements and a second side having a second anti-reflection coating deposited thereon.

15. A method according to claim 1, including a hard coat layer for protecting the at least three birefringent layers.

* * * * *